(12) United States Patent
Sato

(10) Patent No.: US 9,100,798 B2
(45) Date of Patent: Aug. 4, 2015

(54) APPARATUS AND METHOD FOR PERFORMING WIRELESS COMMUNCIATION ACCESS STATIONS VIA A MOBILE TERMINAL

(75) Inventor: Tomonori Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 814 days.

(21) Appl. No.: 13/346,121

(22) Filed: Jan. 9, 2012

(65) Prior Publication Data

US 2012/0182967 A1 Jul. 19, 2012

(30) Foreign Application Priority Data

Jan. 14, 2011 (JP) ................................. 2011-005908

(51) Int. Cl.
| | |
|---|---|
| *H04W 4/06* | (2009.01) |
| *H04L 29/08* | (2006.01) |
| *H04W 88/04* | (2009.01) |
| *H04W 88/08* | (2009.01) |

(52) U.S. Cl.
CPC .................. *H04W 4/06* (2013.01); *H04L 67/28* (2013.01); *H04L 67/2842* (2013.01); *H04W 88/04* (2013.01); *H04W 88/08* (2013.01)

(58) Field of Classification Search
CPC ... H04W 4/005; H04W 4/006; H04W 40/205; H04W 40/22; H04W 84/18; H04W 84/20; H04W 84/22; H04W 88/085; H04W 88/04; H04L 67/12; G08N 25/009; G08N 25/10; G08N 27/005; G08N 27/006

USPC ............... 370/312, 315, 328, 338; 455/414.3, 455/414.2, 456.3, 7, 90.1; 340/539.22, 340/539.26, 425.1, 539.28, 7.48

See application file for complete search history.

(56) References Cited

U.S. PATENT DOCUMENTS

| | | | |
|---|---|---|---|
| 2003/0145092 A1 | 7/2003 | Funato et al. | |
| 2009/0135933 A1* | 5/2009 | Miyoshi | 375/260 |
| 2012/0281658 A1* | 11/2012 | Rikkinen et al. | 370/329 |
| 2013/0028224 A1* | 1/2013 | Chen et al. | 370/329 |
| 2013/0212219 A1* | 8/2013 | Koskela et al. | 709/217 |

FOREIGN PATENT DOCUMENTS

| | | |
|---|---|---|
| JP | 2002-271257 | 9/2002 |
| JP | 2005-516509 | 6/2005 |
| JP | 2008-016990 | 1/2008 |

* cited by examiner

*Primary Examiner* — Un C Cho
*Assistant Examiner* — Jeremy Costin
(74) *Attorney, Agent, or Firm* — Staas & Halsey LLP

(57) ABSTRACT

A packet is transferred between first and second wireless access stations via a memory of at least one mobile terminal. The first wireless access station is provided with source information to be provided for one or more users, and the second wireless access station acquire the source information from the first wireless access station by performing a predetermined procedure of packet transfer between the first and second wireless access stations via the memory of the at least one mobile terminal when the at least one mobile terminal moves between coverage areas of the first and second wireless access stations. The second wireless access station performs a predetermined data processing on the acquired source information, and provides the one or more users with the source information on which the predetermined data processing has been performed.

17 Claims, 19 Drawing Sheets

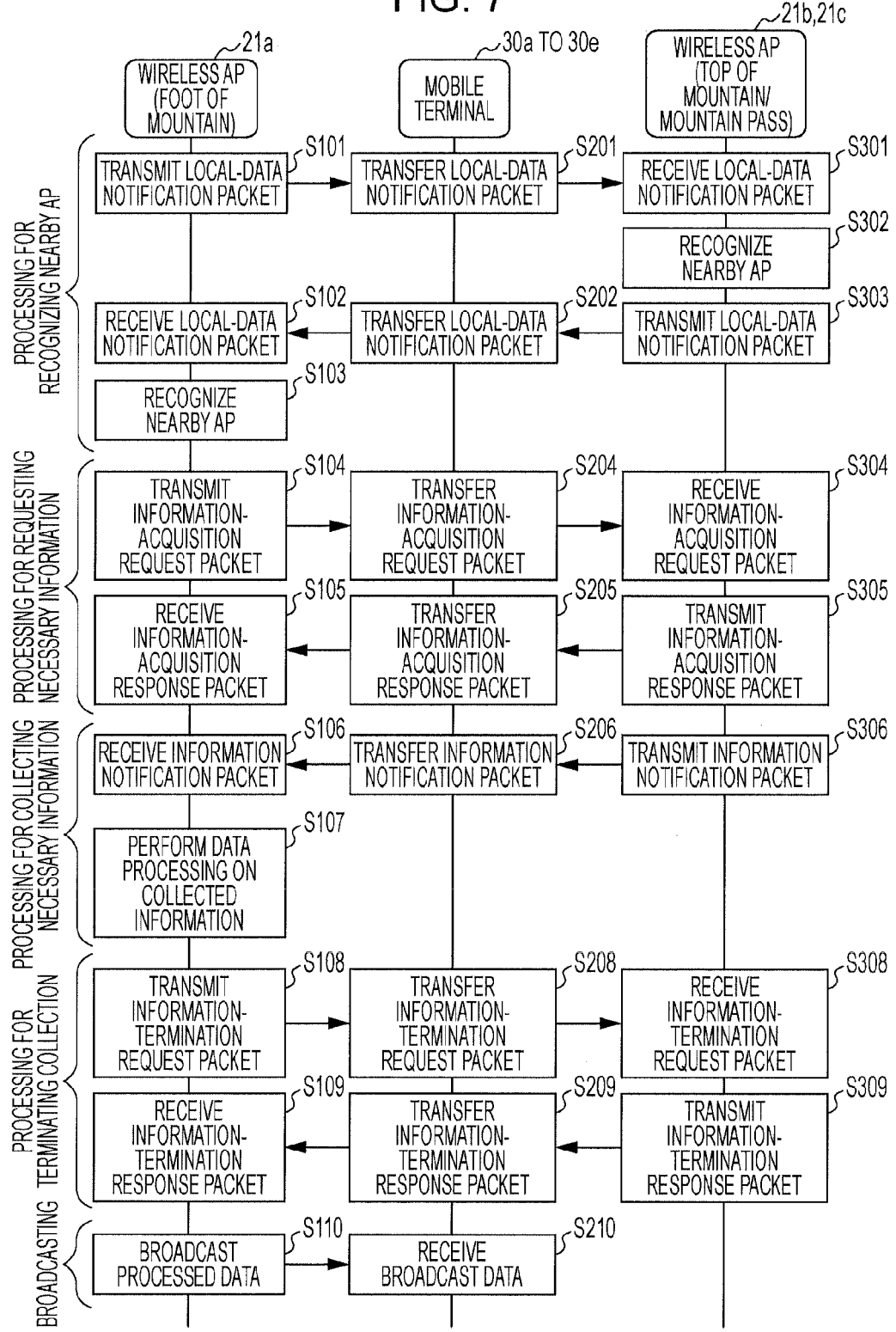

FIG. 8A

LOCAL-DATA NOTIFICATION PACKET

| PACKET ID (ID=0) | PACKET TYPE (TYPE=#0: LOCAL-DATA NOTIFICATION) | NOTIFICATION-SOURCE AP_ID (AP_ID = AP 21a) | NOTIFICATION-DESTINATION AP_ID (AP_ID = ALL) | PAYLOAD (ID/LOCATION INFORMATION/ SENSOR INFORMATION) |
|---|---|---|---|---|

FIG. 8B

NEARBY AP INFORMATION

| AP_ID | INSTALLED LOCATION | SENSOR INFORMATION |
|---|---|---|
| 21a | AT FOOT OF MOUNTAIN | SNOW ACCUMULATION, TEMPERATURE, AND WIND SPEED |
| 21b | RIDGE (AT TOP OF MOUNTAIN) | SNOW ACCUMULATION, TEMPERATURE, AND WIND SPEED |
| 21c | RIDGE (IN MOUNTAIN PASS) | SNOW ACCUMULATION, TEMPERATURE, AND WIND SPEED |

FIG. 8C

INFORMATION-ACQUISITION REQUEST PACKET

| PACKET ID (ID=1) | PACKET TYPE (TYPE=#1: INFORMATION-ACQUISITION REQUEST) | REQUEST-SOURCE AP_ID (AP_ID = AP 21a) | REQUEST-DESTINATION AP_ID (AP_ID = AP 21b) | PAYLOAD (TYPE OF REQUESTED DATA) | | NOTIFICATION INTERVALS |
|---|---|---|---|---|---|---|
| | | | | SNOW ACCUMULATION | TEMPERATURE | |

FIG. 8D

INFORMATION-ACQUISITION RESPONSE PACKET

| PACKET ID (ID = 2) | PACKET TYPE (TYPE = #2: INFORMATION-ACQUISITION RESPONSE) | RESPONSE-SOURCE AP_ID (AP_ID = AP 21b) | RESPONSE-DESTINATION AP_ID (AP_ID = AP 21a) | PAYLOAD (IDENTIFIER OF INFORMATION-ACQUISITION REQUEST PACKET TO BE RESPONDED) |
|---|---|---|---|---|

FIG. 8E

INFORMATION NOTIFICATION PACKET

| PACKET ID (ID = 3) | PACKET TYPE (TYPE = #3: INFORMATION NOTIFICATION) | NOTIFICATION-SOURCE AP_ID (AP_ID = AP 21b) | NOTIFICATION-DESTINATION AP_ID (AP_ID = AP 21a) | PAYLOAD (NOTIFIED DATA) | |
|---|---|---|---|---|---|
| | | | | SNOW ACCUMULATION (X cm) | TEMPERATURE (Y°C) |

FIG. 8F

INFORMATION-TERMINATION REQUEST PACKET

| PACKET ID (ID = 4) | PACKET TYPE (TYPE = #4: INFORMATION-TERMINATION REQUEST) | REQUEST-SOURCE AP_ID (AP_ID = AP 21a) | REQUEST-DESTINATION AP_ID (AP_ID = AP 21b) | PAYLOAD |
|---|---|---|---|---|

FIG. 8G

INFORMATION-TERMINATION RESPONSE PACKET

| PACKET ID (ID = 5) | PACKET TYPE (TYPE = #5: INFORMATION-TERMINATION RESPONSE) | RESPONSE-SOURCE AP_ID (AP_ID = AP 21b) | RESPONSE-DESTINATION AP_ID (AP_ID = AP 21a) | PAYLOAD (IDENTIFIER OF INFORMATION-TERMINATION REQUEST PACKET TO BE RESPONDED) |
|---|---|---|---|---|

FIG. 11A

BROADCAST REQUEST PACKET

| PACKET ID (ID = 0) | PACKET TYPE (TYPE = #6: BROADCAST REQUEST) | REQUEST-SOURCE AP_ID (AP_ID = AP 22a) | REQUEST-DESTINATION AP_ID (AP_ID = AP 22b) | PAYLOAD |

FIG. 11B

BROADCAST RESPONSE PACKET

| PACKET ID (ID = 1) | PACKET TYPE (TYPE = #7: BROADCAST RESPONSE) | RESPONSE-SOURCE AP_ID (AP_ID = AP 22b) | RESPONSE-DESTINATION AP_ID (AP_ID = AP 22a) | PAYLOAD (IDENTIFIER OF BROADCAST REQUEST PACKET TO BE RESPONDED) |

FIG. 11C

BROADCAST-CONTENT NOTIFICATION PACKET

| PACKET ID (ID = 2) | PACKET TYPE (TYPE = #8: BROADCAST-CONTENT NOTIFICATION) | NOTIFICATION-SOURCE AP_ID (AP_ID = AP 22a) | NOTIFICATION-DESTINATION AP_ID (AP_ID = AP 22b) | PAYLOAD (NOTIFIED DATA) |

PAYLOAD (NOTIFIED DATA):
| SPECIAL SALE INFORMATION | CONGESTION INFORMATION | BROADCASTING PERIOD |

FIG. 11D

BROADCAST-CONTENT RESPONSE PACKET

| PACKET ID (ID = 3) | PACKET TYPE (TYPE = #9: BROADCAST-CONTENT RESPONSE) | RESPONSE-SOURCE AP_ID (AP_ID = AP 22b) | RESPONSE-DESTINATION AP_ID (AP_ID = AP 22a) | PAYLOAD (IDENTIFIER OF BROADCAST-CONTENT NOTIFICATION PACKET TO BE RESPONDED) |

FIG. 11E

BROADCAST-TERMINATION NOTIFICATION PACKET

| PACKET ID (ID = 4) | PACKET TYPE (TYPE = #10: BROADCAST-TERMINATION NOTIFICATION) | NOTIFICATION-SOURCE AP_ID (AP_ID = AP 22b) | NOTIFICATION-DESTINATION AP_ID (AP_ID = AP 22a) | PAYLOAD |

FIG. 11F

BROADCAST-TERMINATION RESPONSE PACKET

| PACKET ID (ID = 5) | PACKET TYPE (TYPE = #11: BROADCAST-TERMINATION RESPONSE) | RESPONSE-SOURCE AP_ID (AP_ID = AP 22a) | RESPONSE-DESTINATION AP_ID (AP_ID = AP 22b) | PAYLOAD (IDENTIFIER OF BROADCAST-TERMINATION NOTIFICATION PACKET TO BE RESPONDED) |

FIG. 13A  BROADCAST-CONTENT-CORRECTION REQUEST PACKET

| PACKET ID (ID = 0) | PACKET TYPE (TYPE = #12: BROADCAST-CONTENT-CORRECTION REQUEST) | REQUEST-SOURCE AP_ID (AP_ID = AP 22a) | REQUEST-DESTINATION AP_ID (AP_ID = AP 22b) | PAYLOAD |

FIG. 13B  BROADCAST-CONTENT-CORRECTION RESPONSE PACKET

| PACKET ID (ID = 1) | PACKET TYPE (TYPE = #13: BROADCAST-CONTENT-CORRECTION RESPONSE) | RESPONSE-SOURCE AP_ID (AP_ID = AP 22b) | RESPONSE-DESTINATION AP_ID (AP_ID = AP 22a) | PAYLOAD (IDENTIFIER OF BROADCAST-CONTENT-CORRECTION REQUEST PACKET TO BE RESPONDED) |

FIG. 13C  BROADCAST-CONTENT CORRECTION PACKET

| PACKET ID (ID = 2) | PACKET TYPE (TYPE = #14: BROADCAST-CONTENT CORRECTION) | NOTIFICATION-SOURCE AP_ID (AP_ID = AP 22a) | NOTIFICATION-DESTINATION AP_ID (AP_ID = AP 22b) | PAYLOAD (CORRECTED DATA) | | |
|---|---|---|---|---|---|---|
| | | | | SPECIAL SALE INFORMATION | CONGESTION INFORMATION | BROADCASTING PERIOD |

FIG. 16A

ADVERTISEMENT-DISPLAY REQUEST PACKET

| PACKET ID (ID = 0) | PACKET TYPE (TYPE = #15: ADVERTISEMENT-DISPLAY REQUEST) | REQUEST-SOURCE AP_ID (AP_ID = AP 23a) | REQUEST-DESTINATION AP_ID (AP_ID = AP 23b) | PAYLOAD (ADVERTISEMENT DATA) |

FIG. 16B

ADVERTISEMENT-DISPLAY RESPONSE PACKET

| PACKET ID (ID = 1) | PACKET TYPE (TYPE = #16: ADVERTISEMENT-DISPLAY RESPONSE) | RESPONSE-SOURCE AP_ID (AP_ID = AP 23b) | RESPONSE-DESTINATION AP_ID (AP_ID = AP 23a) | PAYLOAD (IDENTIFIER OF ADVERTISEMENT-DISPLAY REQUEST PACKET TO BE RESPONDED/RECEPTION RESULT OF CORRECT ADVERTISEMENT INFORMATION) | ial in such a manner that the packet transmitted from one of
APPARATUS AND METHOD FOR PERFORMING WIRELESS COMMUNCIATION ACCESS STATIONS VIA A MOBILE TERMINAL

CROSS-REFERENCE TO RELATED APPLICATION

This application is based upon and claims the benefit of priority of the prior Japanese Patent Application No. 2011-005908, filed on Jan. 14, 2011, the entire contents of which are incorporated herein by reference.

FIELD

The present invention relates to an apparatus and method for performing wireless communication between wireless access stations via a mobile terminal.

BACKGROUND

In wireless communication systems such as a mobile phone system, a wireless base station performs wireless communication with mobile terminals being located in a communication area (e.g., cell or sector) thereof. In an example of applications of such wireless communication systems, a wireless base station broadcasts specific information to multiple mobile terminals being located in a communication area thereof. For example, regarding a wireless base station installed at the foot of a mountain, an application is expected in which the wireless base station collects weather information, which is measured by weather sensors installed near the top or the ridge of the mountain, via a wired network and broadcasts the collected information. As a result, at the foot of the mountain, mobile terminals that move along the mountain pass from the foot to the top of the mountain can acquire the weather information about the weather around the top of the mountain. In this way, broadcasting is more likely to be used, for example, when local information (i.e., information having a relatively narrow target range) is transmitted to mobile terminals.

Japanese Laid-open Patent Publication Nos. 2008-16990, 2002-271257, and 2005-516509 disclose the related art.

However, when local information is broadcast from a wide-area wireless base station that covers, for example, a macro-cell, the local information may be unnecessarily broadcast to an undesired area. Moreover, as described above, installation of a dedicated wired line is needed in order for a wireless base station to collect information to be broadcast. For this reason, the configuration in which a wireless base station broadcasts local information has a problem that relatively high cost is required.

On the other hand, it is considered that the introduction of a local access point capable of transmitting (i.e., broadcasting) information to a relatively narrow area may prevent local information from being broadcast to an undesired area. That is, it is considered that the local information can be broadcast limitedly to a relatively narrow desired area by introducing a local access point. However, as described above, installation of a dedicated wired line is still needed in order for the access point to collect information to be broadcast.

Such technical disadvantages occur not only when collected information (or acquired information) is broadcast but also when the collected information (or acquired information) is provided to some kinds of services.

SUMMARY

According to an aspect of the embodiment, there is provided an apparatus and method for performing wireless communication between wireless access stations via a mobile terminal. A first wireless access station is provided with source information to be provided for one or more users. A packet is transferred between first and second wireless access stations via a memory provided for at least one mobile terminal in such a manner that the packet transmitted from one of the first and second wireless access stations is received by the at least one mobile station and stored in the memory thereof when the at least one mobile terminal is located in a coverage area of the one of the first and second wireless access stations, and the packet being stored in the memory of the at least one mobile station is transmitted from the at least one mobile station to the other one of the first and second wireless access stations when the at least one mobile station is located in a coverage area of the other one of the first and second wireless access stations. The second wireless access station acquires the source information from the first wireless access station by performing a predetermined procedure of packet transfer between the first and second wireless access stations via the memory of the at least one mobile terminal when the at least one mobile terminal moves between coverage areas of the first and second wireless access stations. The second wireless access station performs a predetermined data processing on the acquired source information, and provides the one or more users with the source information on which the predetermined data processing has been performed.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 7 is a diagram illustrating an example of an operational sequence performed by a wireless communication system, according to a first embodiment;

FIGS. 8A to 8G are diagrams each illustrating an example of a packet format used for performing a predetermined procedure of packet transfer, according to a first embodiment;

FIGS. 11A to 11F are diagrams each illustrating an example of a packet format used for performing a predetermined procedure of packet transfer, according to a second embodiment;

FIGS. 13A to 13C are diagrams each illustrating an example of a packet format used for performing a predetermined procedure of packet transfer, according to a modification of a second embodiment;

FIGS. 16 A and 16B are diagrams each illustrating an example of a packet format used for performing a predetermined procedure of packet transfer, according to a third embodiment.

DESCRIPTION OF EMBODIMENTS

Embodiments of the present invention will be described below with reference to the accompanying drawings. A description will be given below using a mobile phone system serving as an example of wireless communication systems. However, the embodiments described below may be applied to various wireless communication systems other than the mobile phone system.

(1) First Embodiment

A wireless communication system according to a first embodiment will be described with reference to FIGS. 1 to 8.

(1-1) Configuration of Wireless Communication System

Figure 1:
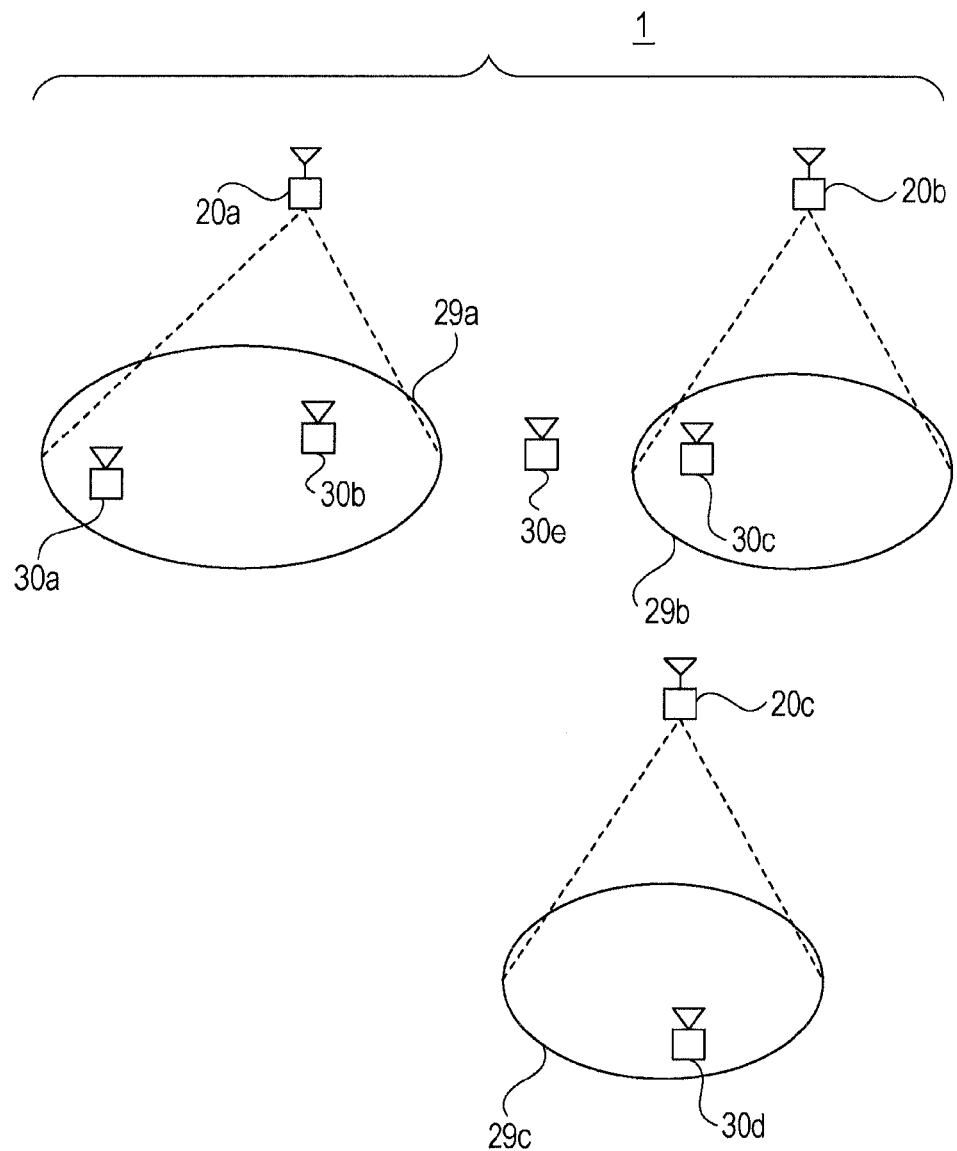
FIG. 1 is a diagram illustrating a configuration example of a wireless communication system, according to a first embodiment.

FIG. 1 is a diagram illustrating a configuration example of a wireless communication system, according to a first embodiment.

As illustrated in FIG. 1, wireless communication system 1 according to the first embodiment includes wireless access points (wireless APs) 20a, 20b, and 20c, and mobile terminals 30a, 30b, 30c, 30d, and 30e. The number of wireless access points and the number of mobile terminals illustrated in FIG. 1 are merely examples, and the number of wireless access points and the number of mobile terminals are not limited to the values illustrated in FIG. 1. For convenience of explanation, when wireless access points 20a to 20c are described without distinction, wireless access points 20a to 20c are collectively referred to as "wireless access points 20" below. Similarly, when mobile terminals 30a to 30e are described without distinction, mobile terminals 30a to 30e are collectively referred to as "mobile terminals 30".

A wireless access point 20 covers coverage area 29 having a predetermined size (e.g., coverage area 29 having a diameter ranging from about several to ten-some, several tens, hundred-some, or several hundreds meters). The wireless access point 20 performs wireless communication with the mobile terminals 30 located in coverage area 29 thereof. More specifically, the wireless access point 20 establishes a wireless communication connection with the mobile terminals 30 being located in the coverage area 29 thereof, and exchanges data with the mobile terminals 30. FIG. 1 illustrates an example in which wireless access point 20a performs wireless communication with mobile terminals 30a and 30b being located in coverage area 29a thereof. Likewise, FIG. 1 illustrates an example in which the wireless AP 20b performs wireless communication with the mobile terminal 30c being located in the coverage area 29b thereof. FIG. 1 also illustrates an example in which wireless access point 20c performs wireless communication with mobile terminal 30d being located in coverage area 29c thereof.

A wireless access point 20 preferably has relatively small transmission power (i.e., relatively small power or relatively weak power). For example, the transmission power of the wireless access point 20 is preferably smaller than that of a wireless base station (so-called macrocell wireless base station) that covers a cell (so-called macrocell) having a cell diameter ranging from about several to ten-some or several tens kilometers. Alternatively, the transmission power of the wireless access point 20 is preferably about the same or smaller than that of a wireless base station (so-called microcell wireless base station) that covers a cell (so-called microcell) having a cell diameter ranging from about several hundreds of meters to a kilometer. Alternatively, the transmission power of the wireless access point 20 is preferably about the same as or smaller than, or larger than that of a wireless base station (so-called femtocell wireless base station) that covers a cell (so-called femtocell) having a cell diameter ranging from several to ten-some or several tens meters. In the following descriptions, "wireless access point" will be also expressed as "wireless access station", and will be also abbreviated as "wireless AP" for ease of explanation.

An installed location of a wireless AP 20 may be fixed. Alternatively, the installed location of a wireless AP 20 may be movable. More specifically, for example, a wireless AP 20 may be installed on a moving object, such as a vehicle or an electric train.

The wireless AP 20 may be installed independently from a wireless base station. In this case, wireless communication system 1 illustrated in FIG. 1 includes wireless base stations that are installed separately from the wireless APs 20. Alternatively, the wireless AP 20 may be installed in a wireless base station. In this case, the wireless AP 20 may be implemented as physical hardware included in the wireless base station or may be implemented as software that runs on a central processing unit (CPU) of the wireless base station. When the wireless AP 20 is installed in a wireless base station, the operation of the wireless base station may be appropriately switched between two operations of the typical wireless base station and the wireless AP 20, or both the two operations may be executed in parallel.

The mobile terminal 30 establishes a wireless communication connection with the wireless AP 20 corresponding to the coverage area 29 where the mobile terminal 30 is located, and performs data transmission between the mobile terminal 30 and the wireless AP 20. When the mobile terminal 30 moves, the mobile terminal 30 appropriately switches a relevant wireless AP 20 with which the mobile terminal 30 communicates, among a plurality of wireless APs 20. For example, when the mobile terminal 30 illustrated in FIG. 1 moves from coverage area 29a to coverage area 29b, the mobile terminal 30 switches the relevant wireless AP 20 from wireless AP 20a to wireless AP 20b. Examples of the mobile terminals 30 include a mobile phone, a personal digital assistant (PDA), and various information devices having the wireless communication function.

(1-2) Configuration of Wireless AP

A configuration of the wireless AP 20 according to the first embodiment will be described with reference to FIGS. 2 and 3.

Figure 2:
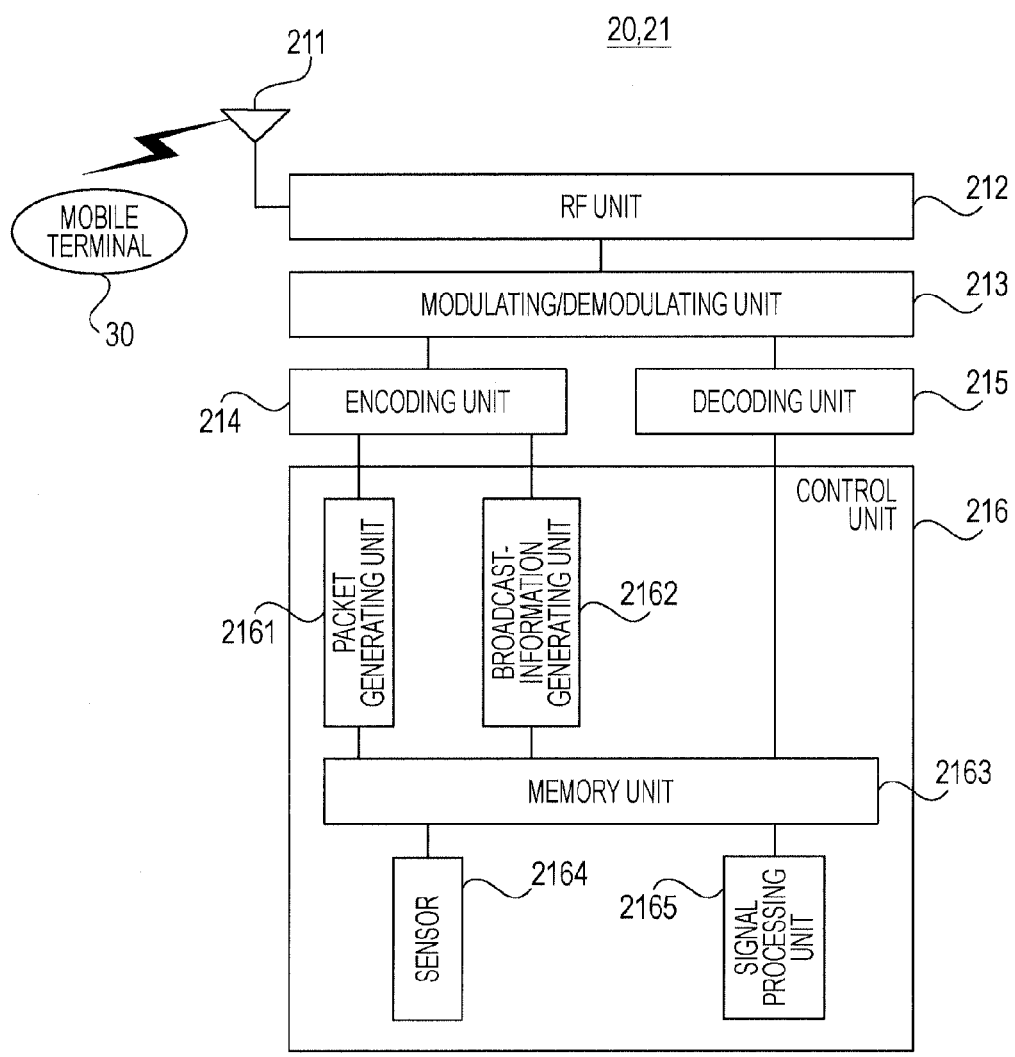
FIG. 2 is a diagram illustrating a configuration example of a wireless access station, according to a first embodiment.

FIG. 2 is a diagram illustrating a configuration example of a wireless access station, according to a first embodiment. In the following descriptions, a wireless AP 20 according to a first embodiment will be denoted as "wireless AP 21" in order to distinguish a wireless AP 20 according to the first embodiment from those according to second and third embodiments.

As illustrated in FIG. 2, a wireless AP 21 according to a first embodiment includes an antenna 211, a radio frequency (RF) unit 212, a modulating/demodulating unit 213, an encoding unit 214, a decoding unit 215, and a control unit 216.

The antenna 211 outputs, to the mobile terminal 30, a radio signal (radio wave) based on data to be transmitted to the mobile terminal 30. The antenna 211 receives a radio signal output from the mobile terminal 30 (i.e., a radio signal based on data transmitted from the mobile terminal 30).

The RF unit 212 performs radio reception processing (e.g., amplification) on the radio signal received by the antenna 211, thereby generating reception data. The RF unit 212 outputs the generated received data to the modulating/demodulating unit 213. On the other hand, the RF unit 212 performs radio transmission processing (e.g., amplification) on transmission data output from the modulating/demodulating unit 213, thereby generating a radio signal. The RF unit 212 outputs the generated radio signal to the antenna 211.

The modulating/demodulating unit 213 demodulates the received data output from the RF unit 212, and outputs the demodulated received data to the decoding unit 215. On the other hand, the modulating/demodulating unit 213 modulates transmission data output from the encoding unit 214, and outputs the modulated transmission data to the RF unit 212.

The encoding unit 214 encodes transmission data output from the control unit 216, and outputs the encoded transmission data to the modulating/demodulating unit 213.

The decoding unit 215 decodes the received data output from the modulating/demodulating unit 213, and outputs the decoded received data to the control unit 216.

The control unit 216 controls operations of the wireless AP 21. The control unit 216 includes, for example, a packet generating unit 2161, a broadcast-information generating unit 2162, a memory unit 2163, a sensor 2164, and a signal processing unit 2165 that serve as physical, logical, or functional processing blocks implemented in the control unit 216.

The packet generating unit 2161 generates various packets (see FIGS. 8A to 8G described later) to be transmitted to the mobile terminal 30 from the wireless AP 21. The packet generating unit 2161 outputs the generated packets to the encoding unit 214 as the transmission data.

The broadcast-information generating unit 2162 extracts information to be broadcast (hereinafter, referred to as "broadcast information") to the coverage area 29 of the wireless AP 21 from various kinds of information (see FIGS. 8A to 8G and so forth) stored in the memory unit 2163. The broadcast-information generating unit 2162 outputs the extracted broadcast information to the encoding unit 214 as the transmission data.

As described above, the transmission power of the wireless AP 21 is relatively small. Accordingly, in the first embodiment, the broadcast information is preferably local information (i.e., local information desired in a relatively narrow range). In the first embodiment, examples of such local information include weather information indicating a local weather state. Given kinds of information other than the weather information (e.g., traffic information indicating a local traffic state, sightseeing information indicating information about a specific sightseeing spot, and spot information indicating information unique to a specific location or place) may be treated as the local information.

The memory unit 2163 stores various kinds of information necessary for operations of the wireless AP 21. In the first embodiment, the memory unit 2163 stores, as source information to be provided for users, broadcast information, nearby AP information (see FIG. 8A to 8G), and so forth. The nearby AP information includes information about other wireless APs 21 that are located near the wireless AP 21 or that perform a series of processes (see FIG. 7) in relation to the wireless AP 21.

The sensor 2164 detects various kinds of information regarding a state related to the wireless AP 21 or the inside, outside, or periphery of the wireless AP 21. Examples of the sensor 2164 include a snow depth sensor, a temperature sensor, and a wind speed sensor. Information detected by the sensor 2164 (measurement result information) may be stored in the memory unit 2163 or may be output to the signal processing unit 2165 described later.

The signal processing unit 2165 performs data processing on various kinds of information received (or acquired or collected) by the wireless AP 21 to convert a format of the information into a format for broadcasting. Alternatively, the signal processing unit 2165 performs data processing, including statistical processing for broadcasting, on the various kinds of information received (or acquired or collected) by the wireless AP 21. That is, the signal processing unit 2165 converts the various kinds of information received (or acquired or collected) by the wireless AP 21 into the broadcast information. Examples of the various kinds of information received (or acquired or collected) by the wireless AP 21 include the following information. First, the wireless AP 21 may receive (or acquire or collect) measurement result information detected by the sensor 2164 included therein. Alternatively, the wireless AP 21 may receive (or acquire or collect) information held by the mobile terminals 30 directly from the individual mobile terminals 30. Alternatively, the wireless AP 21 may receive (or acquire or collect) information held by the other wireless APs 21 (or the measurement result information detected by the sensors 2164 included in the other wireless APs 21) via the mobile terminals 30 each serving as a communication medium. That is, in the first embodiment, the signal processing unit 2165 collectively converts one or more kinds of information acquired from one or more information sources (e.g., the other wireless APs 21, the mobile terminals 30, and the sensor 2164) into the broadcast information. The signal processing unit 2165 stores the broadcast information resulting from the data processing into the memory unit 2163.

The signal processing unit 2165 may also perform reception processing of various packets (see FIGS. 8A to 8G and so forth) transmitted from the other wireless APs 21.

In the first embodiment, an exemplary application is expected in which one wireless AP 21 (e.g., the wireless AP 21a installed at the foot of a mountain) collects measurement result information of the sensor 2164 included in another wireless AP 21 (e.g., at least one of the wireless APs 21b and 21c respectively installed around the top of the mountain and in the mountain pass) and broadcasts the measurement result information. Accordingly, in such an application, the wireless AP 21 on the broadcasting side (e.g., the wireless AP 21a installed at the foot of the mountain) does not have to include the sensor 2164. On the other hand, the wireless AP 21 on the non-broadcasting side (e.g., at least one of the wireless APs 21b and 21c respectively installed near the top of the mountain and in the mountain pass) does not have to include the broadcast-information generating unit 2162.

Figure 3:
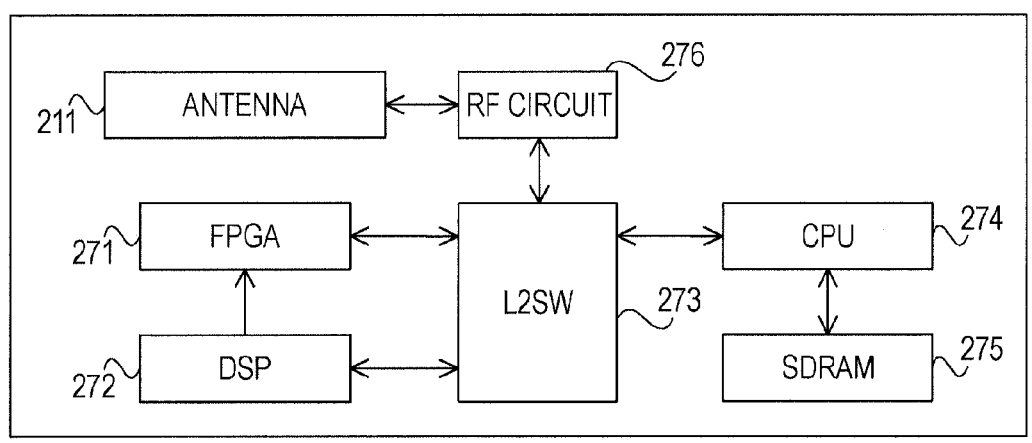
FIG. 3 is a diagram illustrating an example of a hardware configuration of a wireless access station, according to a first embodiment.

FIG. 3 is a diagram illustrating an example of a hardware configuration of a wireless access station, according to a first embodiment.

As illustrated in FIG. 3, the wireless AP 21 includes, from the viewpoint of a hardware configuration, a field programmable gate array (FPGA) 271, a digital signal processor (DSP) 272, a layer 2 switch (L2SW) 273, a central processing unit (CPU) 274, a synchronous dynamic random access memory (SDRAM) 275, a radio frequency (RF) circuit 276, and an antenna 211. The FPGA 271 is an integrated processing circuit including a rewritable logic circuit, which is defined or designed to perform processing compliant with the specifications of the wireless AP 21. The DSP 272 performs various kinds of processing regarding digital signals. The L2SW 273 controls signal transmission performed between the FPGA 271, the DSP 272, the CPU 274, and the RF circuit 276. The CPU 274 is a control circuit that operates based on specific firmware or the like, and controls operations of the wireless AP 21. The SDRAM 275 temporarily stores data used inside the wireless AP 21 (for example, source information to be provided for users, such as nearby AP information) and programs (i.e., firmware) implementing operations of the wireless AP 21. The RF circuit 276 performs radio transmission/reception processing (e.g., amplification). The FPGA 271 and the DSP 272 may be configured to serve as the modulating/demodulating unit 213, the encoding unit 214, and the decoding unit 215 described above. The CPU 274 corresponds to the aforementioned control unit 216. The SDRAM 275 corresponds to the aforementioned memory unit 2163. The RF circuit 276 corresponds to the aforementioned RF unit 212.

(1-3) Configuration of Mobile Terminal

A configuration of the mobile terminal 30 according to a first embodiment will be described with reference to FIGS. 4 and 5.

Figure 4:
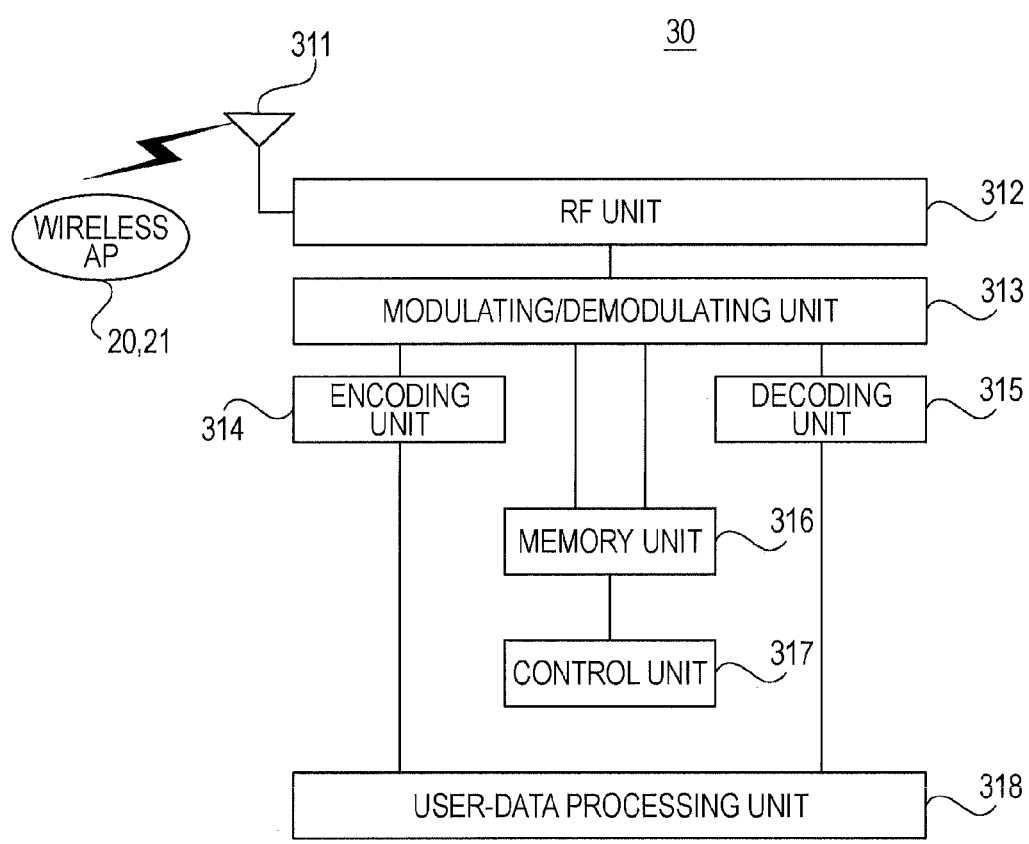
FIG. 4 is a diagram illustrating a configuration example of a mobile terminal, according to a first embodiment.

FIG. 4 is a diagram illustrating a configuration example of a mobile terminal, according to a first embodiment.

As illustrated in FIG. 4, the mobile terminal 30 according to the first embodiment may be configured to include an antenna 311, an RF unit 312, a modulating/demodulating unit 313, an encoding unit 314, a decoding unit 315, a memory unit 316, a control unit 317, and a user-data processing unit 318.

The antenna 311 outputs, to the wireless APs 21 or wireless base stations, a radio signal (radio wave) based on data to be transmitted to the wireless APs 21 or the wireless base stations. The antenna 311 also receives a radio signal output from the wireless APs 21 or the wireless base stations (i.e., radio signal based on data transmitted from the wireless APs 21 or the wireless base stations).

The RF unit 312 performs radio receiving processing (e.g., amplification) on the radio signal received by the antenna 311, thereby generating received data. The RF unit 312 outputs the generated received data to the modulating/demodulating unit 313. On the other hand, the RF unit 312 performs radio transmission processing (e.g., amplification) on transmission data output from the modulating/demodulating unit 313, thereby generating a radio signal. The RF unit 312 outputs the generated radio signal to the antenna 311.

The modulating/demodulating unit 313 demodulates the received data output from the RF unit 312. When the demodulated received data is originally transmitted from the wireless base stations, the modulating/demodulating unit 313 outputs the demodulated received data to the decoding unit 315. When the demodulated received data is originally transmitted from the wireless APs 21 (e.g., various packets illustrated in FIGS. 8A to 8G described below), the modulating/demodulating unit 313 stores the demodulated received data in the memory unit 316.

Additionally, the modulating/demodulating unit 313 modulates transmission data output from the encoding unit 314, and outputs the modulated transmission data to the RF unit 312. The modulating/demodulating unit 313 also modulates various kinds of information (e.g., various packets illustrated in FIGS. 8A to 8G described later) stored in the memory unit 316. The modulating/demodulating unit 313 outputs the modulated various kinds of information (i.e., transmission data) to the RF unit 312.

The encoding unit 314 encodes transmission data output from the user-data processing unit 318. The encoding unit 314 outputs the encoded transmission data to the modulating/demodulating unit 313.

The decoding unit 315 decodes the received data output from the modulating/demodulating unit 313, and outputs the decoded received data to the user-data processing unit 318.

The memory unit 316 temporarily stores various kinds of information (e.g., various packets illustrated in FIGS. 8A to 8G described later) transmitted and received in wireless communication between the wireless APs 21 and the mobile terminal 30.

The control unit 317 controls wireless communication between the wireless APs 21 and the mobile terminal 30. When the various kinds of information (various packets illustrated in FIGS. 8A to 8G described below) are transmitted from the wireless APs 21, the control unit 317 controls the memory unit 316 so that the various kinds of information are temporarily stored in the memory unit 316. When various kinds of information stored in the memory unit 316 are transmitted to the wireless APs 21, the control unit 317 instructs the modulating/demodulating unit 313 about timing of reading the various kinds of information from the memory unit 316. As a result, the modulating/demodulating unit 313 reads out and modulates, at the timing instructed by the control unit 317, the various kinds of information stored in the memory unit 316.

In the first embodiment, the mobile terminal 30 has a function for temporarily storing information transmitted from one wireless AP 21 and for transmitting the information to another wireless AP 21. For example, when the mobile terminal 30 is located in coverage area 29a, the mobile terminal 30 receives information transmitted from wireless AP 21a that covers coverage area 29a, and temporarily stores the information in memory unit 316. After the mobile terminal 30 moves from coverage area 29a to coverage area 29b, the mobile terminal 30 transmits the information temporarily stored in the memory unit 316 to the wireless AP 21b that covers coverage area 29b. As a result, the information is transmitted from wireless AP 21a to wireless AP 21b via the mobile terminal 30. Such a function is realized by memory unit 316 and control unit 317 described above.

The user-data processing unit 318 performs certain data processing (e.g., medium access control (MAC), radio resource control (RRC), and packet data convergence protocol (PDCP) processing) on received data received from wireless base stations. Likewise, the user-data processing unit 318 performs certain data processing on transmission data to be transmitted to wireless base stations. That is, the user-data processing unit 318 performs data processing on various kinds of information (e.g., user data) transmitted and received in wireless communication performed between the wireless base stations and the mobile terminal 30.

Figure 5:
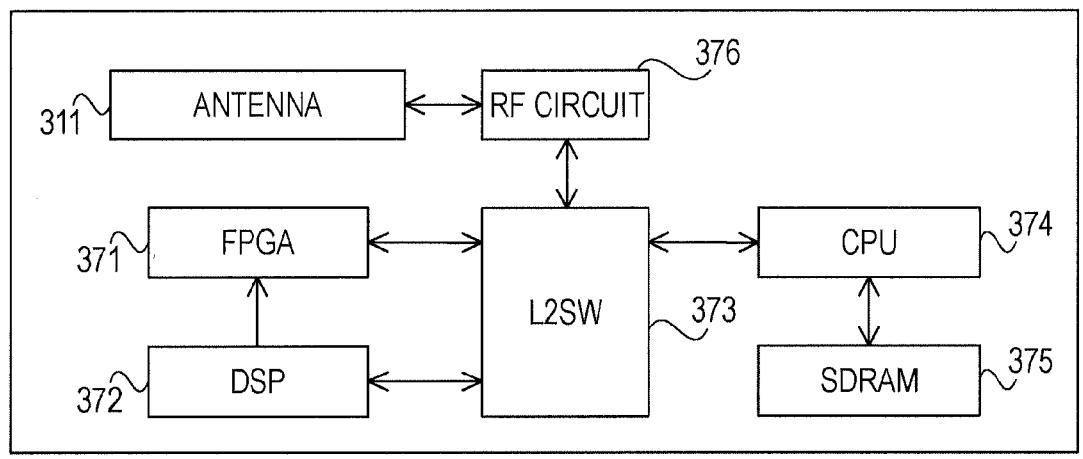
FIG. 5 is a diagram illustrating an example of a hardware configuration of a mobile terminal, according to a first embodiment.

FIG. 5 is a diagram illustrating an example of a hardware configuration of a mobile terminal, according to a first embodiment.

As illustrated in FIG. 5, the mobile terminal 30 includes, from the viewpoint of a hardware configuration, an FPGA 371, a DSP 372, an L2SW 373, a CPU 374, an SDRAM 375, an RF circuit 376, and an antenna 311. The FPGA 371 is an integrated processing circuit including a rewritable logic circuit, which is defined or designed to perform processing compliant with the specifications of the mobile terminal 30. The DSP 372 performs various kinds of processing regarding digital signals. The L2SW 373 controls signal transmission performed between the FPGA 371, the DSP 372, the CPU 374, and the RF circuit 376. The CPU 374 is a control circuit that operates based on specific firmware or the like, and controls operations of the mobile terminal 30. The SDRAM 375 temporarily stores data used inside the mobile terminal 30 and programs (i.e., firmware) implementing operations of the mobile terminal 30. The RF circuit 376 performs radio transmission/reception processing (e.g., amplification). The FPGA 371 and the DSP 372 may be configured to serve as the modulating/demodulating unit 313, the encoding unit 314, the decoding unit 315, and the user-data processing unit 318 described above. The CPU 374 corresponds to the aforementioned control unit 317. The SDRAM 375 corresponds to the aforementioned memory unit 316. The RF circuit 376 corresponds to the aforementioned RF unit 312.

In the example illustrated in FIG. 4, wireless communication between the wireless AP 21 and the mobile terminal 30 and wireless communication between the wireless base station and the mobile terminal 30 are performed using one common antenna 311, one common RF unit 312, and one common modulating/demodulating unit 313. However, the antenna 311, RF unit 312, and modulating/demodulating unit 313 for performing wireless communication between the wireless AP 21 and mobile terminal 30 may be separately prepared from those for performing wireless communication between the wireless base station and the mobile terminal 30. Such a configuration will be described with reference to FIG. 6.

Figure 6:
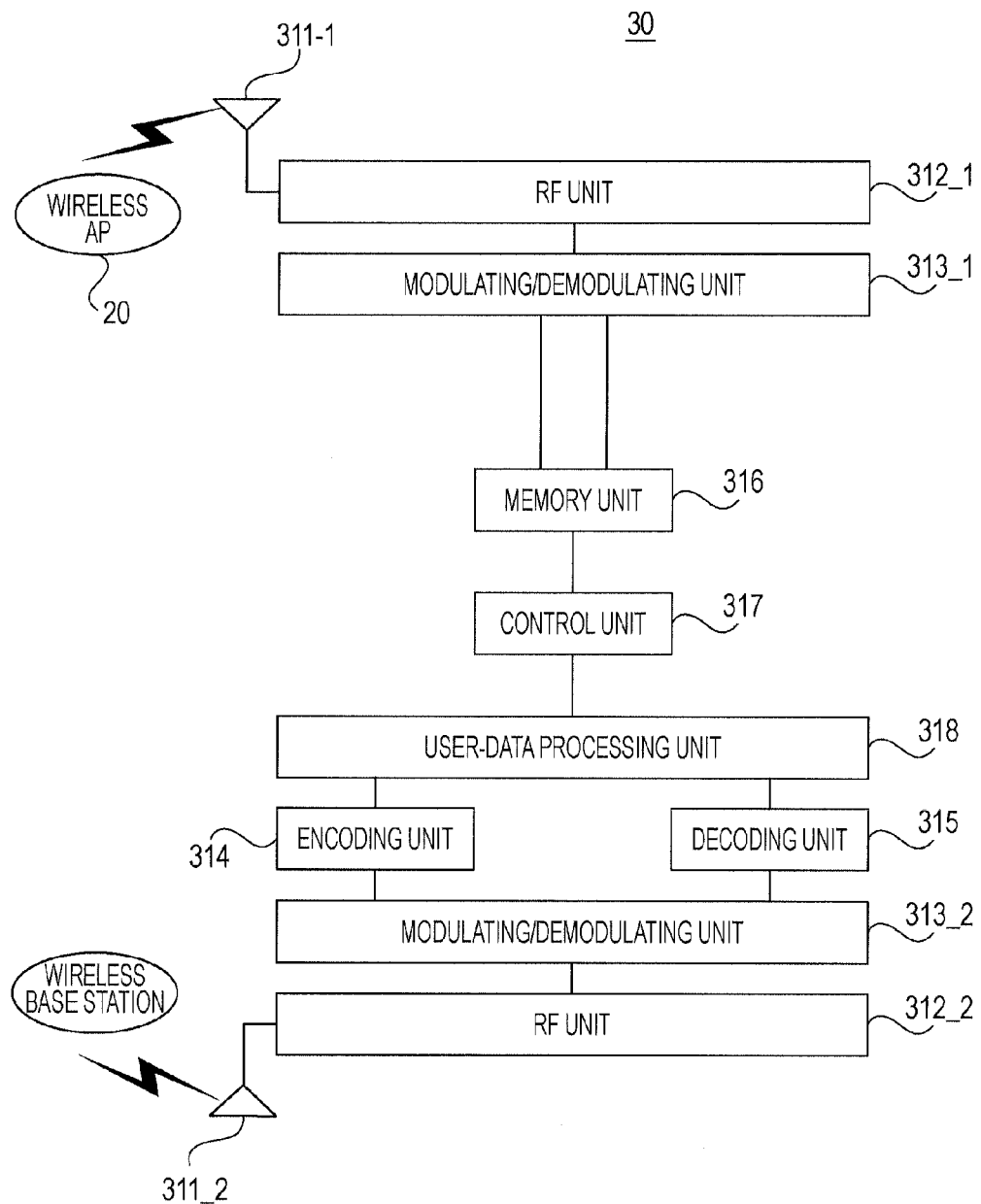
FIG. 6 is a diagram illustrating a configuration example of a mobile terminal, according to a modification of a first embodiment.

FIG. 6 is a diagram illustrating a configuration example of a mobile terminal, according to a modification of a first embodiment.

As illustrated in FIG. 6, the mobile terminal 30 according to the modification of the first embodiment includes a first set of an antenna 311_1, an RF unit 312_1, and a modulating/demodulating unit 313_1 for performing wireless communication between the wireless APs 21 and the mobile terminal 30, and a second set of an antenna 311_2, an RF unit 312_2, and a modulating/demodulating unit 313_2 for performing wireless communication between wireless base stations and the mobile terminal 30, separately from one another. The mobile terminal 30 according to the modification of the first embodiment includes a memory unit 316 and a control unit 317 on the side where the first set of the antenna 311_1, the RF unit 312_1, and the modulating/demodulating unit 313_1 for performing wireless communication between the wireless APs 21 and the mobile terminal 30 are disposed. On the other hand, the mobile terminal 30 according to the modification of the first embodiment includes an encoding unit 314, a decoding unit 315, and a user-data processing unit 318 on the side where the second set of the antenna 311_2, the RF unit 312_2, and the modulating/demodulating unit 313_2 for performing wireless communication between wireless base stations and the mobile terminal 30 are disposed.

(1-4) Operations of Wireless Communication System

Operations of the wireless communication system 1 according to the first embodiment will be described with reference to FIG. 7 and FIGS. 8A to 8G.

FIG. 7 is a diagram illustrating an example of an operational sequence performed by a wireless communication system, according to a first embodiment, in which a predetermined procedure of packet transfer is performed between two wireless access stations. FIGS. 8A to 8G are diagrams each illustrating an example of a packet format used for performing a predetermined procedure of packet transfer, according to a first embodiment.

According to the first embodiment, for example, communication system 1 may be configured in such a manner that one wireless AP 21 (e.g., the wireless AP 21a installed at the foot of a mountain) collects measurement result information of the sensor 2164 included in another wireless AP 21 (e.g., at least one of the wireless APs 21b and 21c respectively installed around the top of the mountain and in the mountain pass) and provides one or more users with the measurement result information, for example, by broadcasting the measurement result information. Hereinafter, the description will be given for an example in which the wireless AP 21a is installed at the foot of a mountain, the wireless AP 21b is installed around the top of the mountain, and the wireless AP 21c is installed in the mountain pass. The wireless AP 21a at least covers an area around the foot of the mountain and does not have to cover an area around the top of the mountain or around the mountain pass. That is, the coverage area 29a of the wireless AP 21a does not have to overlap the coverage area 29b of the wireless AP 21b and the coverage area 29c of the wireless AP 21c.

Additionally, the description will be given below for an example in which the wireless AP 21a collects weather information detected by the sensor 2164 included in each of the wireless APs 21b and 21c and broadcasts the collected weather information to the coverage area 29a of the wireless AP 21a.

As illustrated in FIG. 7, the wireless AP 21a performs processing for causing the other wireless APs 21b and 21c to recognize the presence of the wireless AP 21a (in operation S101, in operation S201, and in operations S301 to S302). The wireless AP 21a also performs processing for recognizing the other wireless APs 21b and 21c (in operation S303, in operation S202, and in operations S102 to S103). These operations may be performed on a periodic or non-periodic basis.

In operation S101, the wireless AP 21a performs the processing for causing the other wireless AP 21b to recognize the presence of the wireless AP 21a in the following manner. The packet generating unit 2161 of the wireless AP 21a generates local-data notification packet for notifying the other wireless AP 21b of information about the wireless AP 21a, and transmits the generated local-data notification packet to the mobile terminal 30 being located in the coverage area 29a of the wireless AP 21a.

As illustrated in FIG. 8A, the local-data notification packet includes fields as follows: a packet ID field for identifying the packet; a packet type field for identifying a type of the packet; a notification-source AP_ID field indicating a wireless AP 21 serving as a source (transmission source) of the notification packet; a notification-destination AP_ID field indicating a wireless AP 21 serving as a destination (transmission destination) of the notification packet; and a payload field storing information about the wireless AP 21a. In the example illustrated in FIG. 8A, "0" is stored in the packet ID field, "#0"

indicating that the type of this packet is the local-data notification packet is stored in the packet type field, an apparatus ID (AP_ID) of the wireless AP 21a serving as the notification source of the local-data notification packet is stored in the notification-source AP_ID field, and "all" for specifying all wireless APs 21 as notification destinations of the local-data notification packet is stored in the notification-destination AP_ID field. The payload field stores, as the information about the wireless AP 21a, the AP_ID of the wireless AP 21a, location information indicating a location (e.g., the foot of a mountain) where the wireless AP 21a is installed, and sensor information indicating information (e.g., information about snow accumulation, temperature, and wind speed) that can be measured by the sensor 2164 of the wireless AP 21a.

Referring back to FIG. 7, in operation S201, the mobile terminal 30 being located in the coverage area 29a of the wireless AP 21a receives the local-data notification packet transmitted from the wireless AP 21a. The control unit 317 of the mobile terminal 30 temporarily stores the received local-data notification packet in the memory unit 316. After the mobile terminal 30 moves to the coverage area 29b of the other wireless AP 21b, the control unit 317 of the mobile terminal 30 controls the modulating/demodulating unit 313 so that the modulating/demodulating unit 313 reads out and transmits the local-data notification packet stored in the memory unit 316. As a result, the mobile terminal 30 can transfer the local-data notification packet transmitted from the wireless AP 21a to the other wireless AP 21b.

As is understood from the above description, according to the first embodiment, data (packet) is transmitted and received between one wireless AP 21 (wireless AP 21a) and other wireless APs 21 (wireless APs 21b and 21c) via the memory unit 316 of the mobile terminals 30. That is, transmission and reception of data (packet) between the one wireless AP 21 and the other wireless APs 21 are performed in wireless communication via the memory unit 316 of the mobile terminals 30 instead of direct wireless communication between the one wireless AP 21 and the other wireless APs 21. The configuration in which transmission and reception of data are performed between the one wireless AP 21 and the other wireless APs 21 via the memory unit 316 of the mobile terminals 30 is similarly used in the following description.

In operation S301, the signal processing unit 2165 of the wireless AP 21b then receives the local-data notification packet transmitted (i.e., transferred) from the mobile terminal 30. When the AP_ID stored in the notification-destination AP_ID field of the received local-data notification packet matches an AP_ID of the wireless AP 21b, the signal processing unit 2165 of the wireless AP 21b refers to the payload field of the received local-data notification packet, thereby recognizing the presence of the wireless AP 21a (in operation S302). On the other hand, when the AP_ID stored in the notification-destination AP_ID field of the received local-data notification packet does not match the AP_ID of the wireless AP 21b, the signal processing unit 2165 of the wireless AP 21b may discard the received local-data notification packet.

The foregoing description is about the processing for causing the other wireless AP 21b to recognize the presence of the wireless AP 21a, which is performed by the wireless AP 21a. However, processing for causing the other wireless AP 21c to recognize the presence of the wireless AP 21a may be performed by the wireless AP 21a in the similar manner. Additionally, processing for causing the other wireless AP 21a or 21c to recognize the presence of the wireless AP 21b may be performed by the wireless AP 21b in the similar manner. Processing for causing the other wireless AP 21a or 21b to recognize the presence of the wireless AP 21c may be also performed by the wireless AP 21c in the similar manner.

The processing for recognizing the other wireless AP 21b is performed by the wireless AP 21a in the following manner.

In operation S303, the packet generating unit 2161 of the wireless AP 21b generates a local-data notification packet for notifying the other wireless AP 21a of information about the wireless AP 21b, and transmits the generated local-data notification packet to the mobile terminal 30 being located in the coverage area 29b of the wireless AP 21b.

In operation S202, the mobile terminal 30 transfers, to the wireless AP 21a, the local-data notification packet transmitted from the wireless AP 21b. This transfer may be performed in the same way as the transfer in operation S201 described above.

In operation S102, the signal processing unit 2165 of the wireless AP 21a receives the local-data notification packet transmitted (i.e., transferred) from the mobile terminal 30, and refers to a payload field of the received local-data notification packet, thereby recognizing the presence of the wireless AP 21b (in operation S103). The processing for recognizing the presence of the wireless AP 21b in operation S103 is similar to the processing for recognizing the presence of the wireless AP 21a in step S302.

The foregoing description is about the processing for recognizing the other wireless AP 21b performed by the wireless AP 21a. Processing for recognizing the other wireless AP 21c may be also performed by the wireless AP 21a in the similar manner. Additionally, processing for recognizing the other wireless AP 21a or 21c may be performed by the wireless AP 21b in the similar manner. Processing for recognizing the other wireless AP 21a or 21b may be performed by the wireless AP 21c in the similar manner.

As a result of the foregoing processing, information about the other wireless APs 21 recognized by one wireless AP 21 is managed in the memory unit 2163 of the one wireless AP 21 as nearby AP information. For example, as illustrated in FIG. 8B, the nearby AP information includes an AP_ID field indicating the AP_ID of the other wireless AP 21, an installed location field indicating a location where the other wireless AP 21 is installed, and a sensor information field indicating information that can be measured by the sensor 2164 of the other wireless AP 21. FIG. 8B illustrates an example of the nearby AP information stored in the memory unit 2163 of the wireless AP 21a. The example illustrated in FIG. 8B includes, as information about the wireless AP 21b, a record in which the "AP_ID of the wireless AP 21b" is stored in the AP_ID field, "ridge (at top of mountain)" is stored in the installed location field, and "snow accumulation, temperature, and wind speed" are stored in the sensor information field. The example illustrated in FIG. 8B also includes, as information about the wireless AP 21c, a record in which the "AP_ID of the wireless AP 21c" is stored in the AP_ID field, "ridge (in mountain pass)" is stored in the installed location field, and "snow accumulation, temperature, and wind speed" are stored in the sensor information field.

The nearby AP information may include information about the wireless AP 21 itself as well as information about the other wireless APs 21. The example illustrated in FIG. 8B includes, as information about the wireless AP 21 itself (i.e., information about the wireless AP 21a), a record in which the "AP_ID of the wireless AP 21a" is stored in the AP_ID field, "at foot of mountain" is stored in the installed location field, and "snow accumulation, temperature, and wind speed" are stored in the sensor information field.

Referring again to FIG. 7, in a sequence of operations S104, S204, S304, S305, S205, and S105, the wireless AP 21a performs processing for requesting the other wireless AP 21*b* to transmit source information to be broadcast by the wireless AP 21*a* (e.g., measurement result information of the sensor 2164) so that the source information is transferred to the wireless AP 21*a*.

More specifically, the packet generating unit 2161 of the wireless AP 21*a* generates an information-acquisition request packet for requesting the other wireless AP 21*b* to transmit the source information to the wireless AP 21*a*, and transmits the generated information-acquisition request packet to the mobile terminal 30 being located in the coverage area 29*a* of the wireless AP 21*a* (in operation S104).

As illustrated in FIG. 8C, the information-acquisition request packet includes a packet ID field, a packet type field, a request-source AP_ID field indicting a wireless AP 21 serving as a source (transmission source) of the request packet, a request-destination AP_ID field indicating a wireless AP 21 serving as a destination (transmission destination) of the request packet, and a payload field storing information for identifying a type of the requested source information. In the example illustrated in FIG. 8C, "1" is stored in the packet ID field, an identification number "#1" indicating that the type of this packet is the information-acquisition request packet is stored in the packet type field, the AP_ID of the wireless AP 21*a* serving as the request source of the information-acquisition request packet is stored in the request-source AP_ID field, the AP_ID of the wireless AP 21*b* serving as the request destination of the information-acquisition request packet is stored in the request-destination AP_ID field, and "snow accumulation" and "temperature" are stored as the types of the requested source information in the payload field. Additionally, "notification intervals" indicating intervals at which the request-destination wireless AP 21*b* transmits information on "snow accumulation" and "temperature" may be stored in the payload field.

Preferably, the packet generating unit 2161 of the wireless AP 21*a* determines which wireless AP 21 the wireless AP 21*a* requests to transmit which type of source information with reference to the nearby AP information, and generates the information-acquisition request packet based on the determined result.

Referring again to FIG. 7, in operation S204, the mobile terminal 30 transfers, to the other wireless AP 21*b*, the information-acquisition request packet transmitted from the wireless AP 21*a*. This transfer may be performed in the same way as the transfer in operations S201 and S202 described above.

In operation S304, the signal processing unit 2165 of the wireless AP 21*b* receives the information-acquisition request packet transmitted (i.e., transferred) from the mobile terminal 30 being located in the coverage area 29*b* of the wireless AP 21*b*. When the AP_ID stored in the request-destination AP_ID field of the received information-acquisition request packet does not match the AP_ID of the wireless AP 21*b*, the signal processing unit 2165 of the wireless AP 21*b* may discard the received information-acquisition request packet. On the other hand, when the AP_ID stored in the request-destination AP_ID field of the received information-acquisition request packet matches the AP_ID of the wireless AP 21*b*, the signal processing unit 2165 of the wireless AP 21*b* controls the packet generating unit 2161 of the wireless AP 21*b* so that an information-acquisition response packet serving as a response message is generated.

As a result, in operation S305, the packet generating unit 2161 of the wireless AP 21*b* generates the information-acquisition response packet, and transmits the generated information-acquisition response packet to the mobile terminal 30 being located in the coverage area 29*b* of the wireless AP 21*b*.

As illustrated in FIG. 8D, the information-acquisition response packet includes a packet ID field, a packet type field, a response-source AP_ID field indicating a wireless AP 21 serving as a source (transmission source) of the response packet, a response-destination AP_ID field indicating a wireless AP 21 serving as a destination (transmission destination) of the response packet, and a payload field storing an identifier for identifying an information-acquisition request packet to be responded. In the example of FIG. 8D, "2" is stored in the packet ID field, identification number "#2" indicating that the type of this packet is the information-acquisition response packet is stored in the packet type field, the AP_ID of the wireless AP 21*b* serving as the response source of the information-acquisition response packet is stored in the response-source AP_ID field, the AP_ID of the wireless AP 21*a* serving as the response destination of the information-acquisition response packet is stored in the response-destination AP_ID field, and an identifier identifying an information-acquisition request packet to be responded (e.g., a packet ID included in the received information-acquisition request packet) is stored in the payload field.

Referring again to FIG. 7, in operation S205, the mobile terminal 30 transfers, to the wireless AP 21*a*, the information-acquisition response packet transmitted from the wireless AP 21*b*. This transfer may be performed in the same way as the transfer in operations S201 to S204 described above.

In operation S105, the signal processing unit 2165 of the wireless AP 21*a* receives the information-acquisition response packet transmitted (i.e., transferred) from the mobile terminal 30. When the AP_ID stored in the response-destination AP_ID field of the received information-acquisition response packet does not match the AP_ID of the wireless AP 21*a*, the signal processing unit 2165 of the wireless AP 21*a* may discard the received information-acquisition response packet. In this case, the packet generating unit 2161 of the wireless AP 21*a* preferably transmits the information-acquisition request packet again after predetermined time. On the other hand, when the AP_ID stored in the response-destination AP_ID field of the received information-acquisition response packet matches the AP_ID of the wireless AP 21*a*, the signal processing unit 2165 of the wireless AP 21*a* determines whether or not the received information-acquisition response packet is a response message for the information-acquisition request packet transmitted in operation S104 with reference to the payload field of the received information-acquisition response packet. When the received information-acquisition response packet is not a response message for the information-acquisition request packet transmitted in operation S104, the packet generating unit 2161 of the wireless AP 21*a* preferably transmits the information-acquisition request packet again after predetermined time. The packet generating unit 2161 of the wireless AP 21*a* also preferably transmits the information-acquisition request packet again when a predetermined time period has elapsed without receiving the information-acquisition response packet after transmitting the information-acquisition request packet in operation S104.

The foregoing description is about the processing for requesting the other wireless AP 21*b* to transmit the source information, which is performed by the wireless AP 21*a*. Processing for requesting the other wireless AP 21*c* to transmit the source information may be performed by the wireless AP 21*a* in the similar manner.

In a sequence of operations S306, S206, S106, and S107, the wireless AP 21*a* performs processing for collecting (i.e., receiving) the source information from the other wireless AP 21*b* when the information-acquisition response packet received in operation S106 is a response message for the information-acquisition request packet transmitted in operation S104.

More specifically, in operation S306, when the AP_ID stored in the request-destination AP_ID field of the information-acquisition request packet received in operation S304 matches the AP_ID of the wireless AP 21*b*, the signal processing unit 2165 of the wireless AP 21*b* controls the packet generating unit 2161 of the wireless AP 21*b* so that an information notification packet is generated and transmitted. At this time, the signal processing unit 2165 of the wireless AP 21*b* preferably notifies the packet generating unit 2161 of the type of the requested source information, the notification intervals, and so forth stored in the payload field of the information-acquisition request packet received in operation S304. As a result, the packet generating unit 2161 of the wireless AP 21*b* generates the information notification packet including the source information of the requested type. Then, the packet generating unit 2161 of the wireless AP 21*b* transmits the generated information notification packet to the mobile terminal 30 located in the coverage area 29*b* of the wireless AP 21*b*. In the case, generation and transmission of the information notification packet are preferably performed in synchronization with timing indicated by the notification intervals stored in the payload field of the information-acquisition request packet received in operation S304.

As illustrated in FIG. 8E, the information notification packet includes a packet ID field, a packet type field, a notification-source AP_ID field indicating a wireless AP 21 serving as a source (transmission source) of the notification packet, a notification-destination AP_ID field indicating a wireless AP 21 serving as a destination (transmission destination) of the notification packet, and a payload field including the source information to be provided for one or more users. In the example illustrated in FIG. 8E, "3" is stored in the packet ID field, an identification number "#3" indicating that the type of this packet is the information notification packet is stored in the packet type field, the AP_ID of the wireless AP 21*b* serving as the notification source of the information notification packet is stored in the notification-source AP_ID field, the AP_ID of the wireless AP 21*a* serving as the notification destination of the information notification packet is stored in the notification-destination AP_ID field, and information indicating "snow accumulation (cm)" and information indicating "temperature (° C.)" are stored as the source information to be provided in the payload field.

Referring again to FIG. 7, in operation S206, the mobile terminal 30 transfers, to the wireless AP 21*a*, the information notification packet transmitted from the wireless AP 21*b*. This transfer may be performed in the same way as the transfer in operations S201 to S205 described above.

In operation S106, the signal processing unit 2165 of the wireless AP 21*a* receives the information notification packet transmitted (i.e., transferred) from the mobile terminal 30 being located in the coverage area 29*a* of the wireless AP 21*a*. When the AP_ID stored in the notification-destination AP_ID field of the received information notification packet does not match the AP_ID of the wireless AP 21*a*, the signal processing unit 2165 of the wireless AP 21*a* may discard the received information notification packet. On the other hand, when the AP_ID stored in the notification-destination AP_ID field of the received information notification packet matches the AP_ID of the wireless AP 21*a*, the signal processing unit 2165 of the wireless AP 21*a* refers to the payload field of the received information notification packet, thereby acquiring the source information. [0085] In operation S107, the signal processing unit 2165 of the wireless AP 21*a* performs a pre-determined data processing on the acquired source information by converting the acquired source information into broadcast information having a format for broadcasting, and stores the broadcast information resulting from the conversion in the memory unit 2163.

The foregoing description is about the processing for collecting (i.e., receiving) the source information from the other wireless AP 21*b*, which is performed by the wireless AP 21*a*. Processing for collecting (i.e., receiving) the source information from the other wireless AP 21*c* may be performed by the wireless AP 21*a* in the similar manner.

In a sequence of operations S108, S208, S308, S309, S209, and S109, the wireless AP 21*a* performs processing for terminating collection of the source information from the other wireless AP 21*b*.

More specifically, in operation S108, the packet generating unit 2161 of the wireless AP 21*a* generates an information-termination request packet for requesting the other wireless AP 21*b* to terminate the collection of the source information, and transmits the generated information-termination request packet to the mobile terminal 30 being located in the coverage area 29*a* of the wireless AP 21*a*.

As illustrated in FIG. 8F, the information-termination request packet includes a packet ID field, a packet type field, a request-source AP_ID field indicating a wireless AP 21 serving as a source (transmission source) of the request packet, a request-destination AP_ID, field indicating a wireless AP 21 serving as a destination (transmission destination) of the request packet, and a payload field. In the example illustrated in FIG. 8F, "4" is stored in the packet ID field, "#4" indicating that the type of this packet is the information-termination request packet is stored in the packet type field, the AP_ID of the wireless AP 21*a* serving as the request source of the information-termination request packet is stored in the request-source AP_ID field, the AP_ID of the wireless AP 21*b* serving as the request destination of the information-termination request packet is stored in the request-destination AP_ID field, and given information or no information may be stored in the payload field.

Referring again to FIG. 7, in operation S208, the mobile terminal 30 transfers, to the other wireless AP 21*b*, the information-termination request packet transmitted from the wireless AP 21*a*. This transfer may be performed in the same way as the transfer in operations S201 to S206 described above.

In operation S308, the signal processing unit 2165 of the wireless AP 21*b* receives the information-termination request packet transmitted (i.e., transferred) from the mobile terminal 30. When the AP_ID stored in the request-destination AP_ID field of the received information-termination request packet does not match the AP_ID of the wireless AP 21*b*, the signal processing unit 2165 of the wireless AP 21*b* may discard the received information-termination request packet. On the other hand, when the AP_ID stored in the request-destination AP_ID field of the received information-termination request packet matches the AP_ID of the wireless AP 21*b*, the signal processing unit 2165 of the wireless AP 21*b* controls the packet generating unit 2161 of the wireless AP 21*b* so that an information-termination response packet serving as a response message is generated. As a result, the packet generating unit 2161 of the wireless AP 21*b* generates the information-termination response packet, and transmits the generated information-termination response packet to the mobile terminal 30 being located in the coverage area 29*b* of the wireless AP 21*b* (in operation S309).

As illustrated in FIG. 8G, the information-termination response packet includes a packet ID field, a packet type field, a response-source AP_ID field indicating a wireless AP 21 serving as a source (transmission source) of the response packet, a response-destination AP_ID field indicating a wireless AP 21 serving as a destination (transmission destination) of the response packet, and a payload field storing an identifier for identifying an information-termination request packet to be responded. In the example illustrated in FIG. 8G, "5" is stored in the packet ID field, an identification number "#5" indicating that the type of this packet is the information-termination response packet is stored in the packet type field, the AP_ID of the wireless AP 21b serving as the response source of the information-termination response packet is stored in the response-source AP_ID field, the AP_ID of the wireless AP 21a serving as the response destination of the information-termination response packet is stored in the response-destination AP_ID field, and an identifier identifying an information-termination request packet to be responded (e.g., a packet ID included in the received information-termination request packet) is stored in the payload field.

Referring again to FIG. 7, in operation S209, the mobile terminal 30 transfers, to the wireless AP 21a, the information-termination response packet transmitted from the wireless AP 21b. This transfer may be performed in the same way as the transfer in operations S201 to S208 described above.

In operation S109, the signal processing unit 2165 of the wireless AP 21a receives the information-termination response packet transmitted (i.e., transferred) from the mobile terminal 30 being located in the coverage area 29a of the wireless AP 21a. When the AP_ID stored in the response-destination AP_ID field of the received information-termination response packet does not match the AP_ID of the wireless AP 21a, the signal processing unit 2165 of the wireless AP 21a may discard the received information-termination response packet. On the other hand, when the AP_ID stored in the response-destination AP_ID field of the received information-termination response packet matches the AP_ID of the wireless AP 21a, the signal processing unit 2165 of the wireless AP 21a recognizes that collection of the source information has completed.

The foregoing description is about the processing for terminating the collection of the source information from the other wireless AP 21b performed by the wireless AP 21a. Processing for terminating the collection of the source information from the other wireless AP 21c may be performed by the wireless AP 21a in the similar manner.

In operation S110, the broadcast-information generating unit 2162 of the wireless AP 21a provides users with the collected source information by broadcasting broadcast information generated from the collected source information. For example, the broadcast-information generating unit 2162 of the wireless AP 21a extracts part of or all of the broadcast information stored in the memory unit 2163, and broadcasts the extracted broadcast information to the coverage area 29a of the wireless AP 21a. As a result, the mobile terminal 30 located in the coverage area 29a of the wireless AP 21a receives the broadcast information (in operation S210).

Each of operations S201 to S210 of mobile terminal 30 illustrated in FIG. 7 may be performed by a single mobile terminal 30 or by different mobile terminals 30. In consideration of an actual movement state (movement tendency) of the mobile terminals 30, it is estimated that each operation is performed by different mobile terminals 30 in many cases.

The foregoing description is given for the example in which one wireless AP 21 (wireless AP 21a) broadcasts source information collected from a plurality of wireless APs 21 (wireless APs 21b and 21c). However, one wireless AP 21 may broadcast source information collected from another wireless AP 21. Alternatively, each of a plurality of wireless APs 21 may broadcast source information collected from one or more wireless APs 21.

As described above, in accordance with the first embodiment, the wireless AP 21a may collect source information transmitted from the wireless APs 21b and 21c (e.g., measurement result information, such as about snow accumulation, temperature, and wind speed, detected by the sensor 2164) in wireless communication performed via the mobile terminals 30. The wireless AP 21a may also convert the collected source information into broadcast information having a format for broadcasting and may provide users with the collected source information by broadcasting the converted broadcast information. Accordingly, the mobile terminal 30 may favorably acquire, at the foot of a mountain (i.e., when the mobile terminal 30 is located in the coverage area 29a of the wireless AP 21a), source information about weather around the top of the mountain and in the mountain pass where the wireless APs 21b and 21c are installed, respectively. That is, the mobile terminal 30 may favorably acquire source information about weather around the top of the mountain and the mountain pass, where the wireless APs 21b and 21c are installed respectively, before reaching the top of the mountain or the mountain pass (i.e., before reaching the coverage area 29b of the wireless AP 21b and the coverage area 29c of the wireless AP 21c).

In accordance with the first embodiment, the wireless AP 21a may collect the source information transmitted from the wireless APs 21b and 21c without using a wired dedicated line that connects the wireless AP 21a to the wireless AP 21b or 21c. Accordingly, cost of introducing the wireless communication system 1 may be suppressed low.

In accordance with the first embodiment, one wireless AP 21 may request and acquire desired information belonging to other wireless APs, which are incapable of directly communicating with the wireless AP 21, via mobile terminals. The wireless AP 21 may broadcast information acquired from the other wireless APs to a coverage area thereof. Additionally, local information (local broadcast information) may be favorably broadcast to a local area using the wireless AP 21 having relatively small transmission power.

Meanwhile, techniques disclosed in the related art differ from the wireless APs 21 according to the first embodiment in that only wireless base stations having relatively large transmission power are subjected in the related art. Additionally, in the techniques disclosed in the related art, information is transferred as it is from one wireless base station to another wireless base station via a mobile terminal when wired communication between the wireless base stations is not available. However, in the techniques disclosed in the related art, information is simply transferred between the wireless base stations (i.e., no data processing is performed on the transferred information) and it may be technically difficult to broadcast the transferred information. Furthermore, in the techniques disclosed in the related art, information is transferred between wireless base stations on a one-to-one basis (i.e., transfer between wireless base stations on a multiple-to-one, one-to-multiple, or multiple-to-multiple basis is not considered) and it may be technically difficult to process information collected from a plurality of wireless APs 21 into data for broadcasting and to broadcast the processed data. In this regard, the techniques of the related art also differ from the wireless APs 21 according to the first embodiment.

Moreover, in accordance with the first embodiment, a wireless AP 21 serving as a transmission source of source information does not have to distinguish the mobile terminals 30 that perform transfer and may use a given mobile terminal 30 located in the coverage area 29 of the wireless AP 21 as an information transfer medium. Additionally, the mobile terminal 30 may transfer the information without identifying wireless APs 21 serving as the information transmission source and the information transmission destination.

(2) Second Embodiment

A wireless communication system 2 according to a second embodiment will be described with reference to FIGS. 9, 10, 11A to 11F, 12, 13A to 13C. The wireless communication system 2 according to the second embodiment differs from the wireless communication system 1 according to the first embodiment in a configuration and operations of a wireless AP 20. Other than the configuration and operations of the wireless AP 20, the wireless communication system 2 according to the second embodiment may be the same as or may be different from the wireless communication system 1 according to the first embodiment. For simplicity of explanation, the description will be given below for the configuration and operations of the wireless AP 20 according to the second embodiment that are different from those of the wireless communication system 1 according to the first embodiment.

In order to distinguish the wireless AP 20 according to the second embodiment from those according to the first and third embodiments, the wireless AP 20 according to the second embodiment is denoted as a "wireless AP 22" below.

(2-1) Configuration of Wireless AP

A configuration of the wireless AP 22 according to the second embodiment will be described with reference to FIG. 9.

Figure 9:
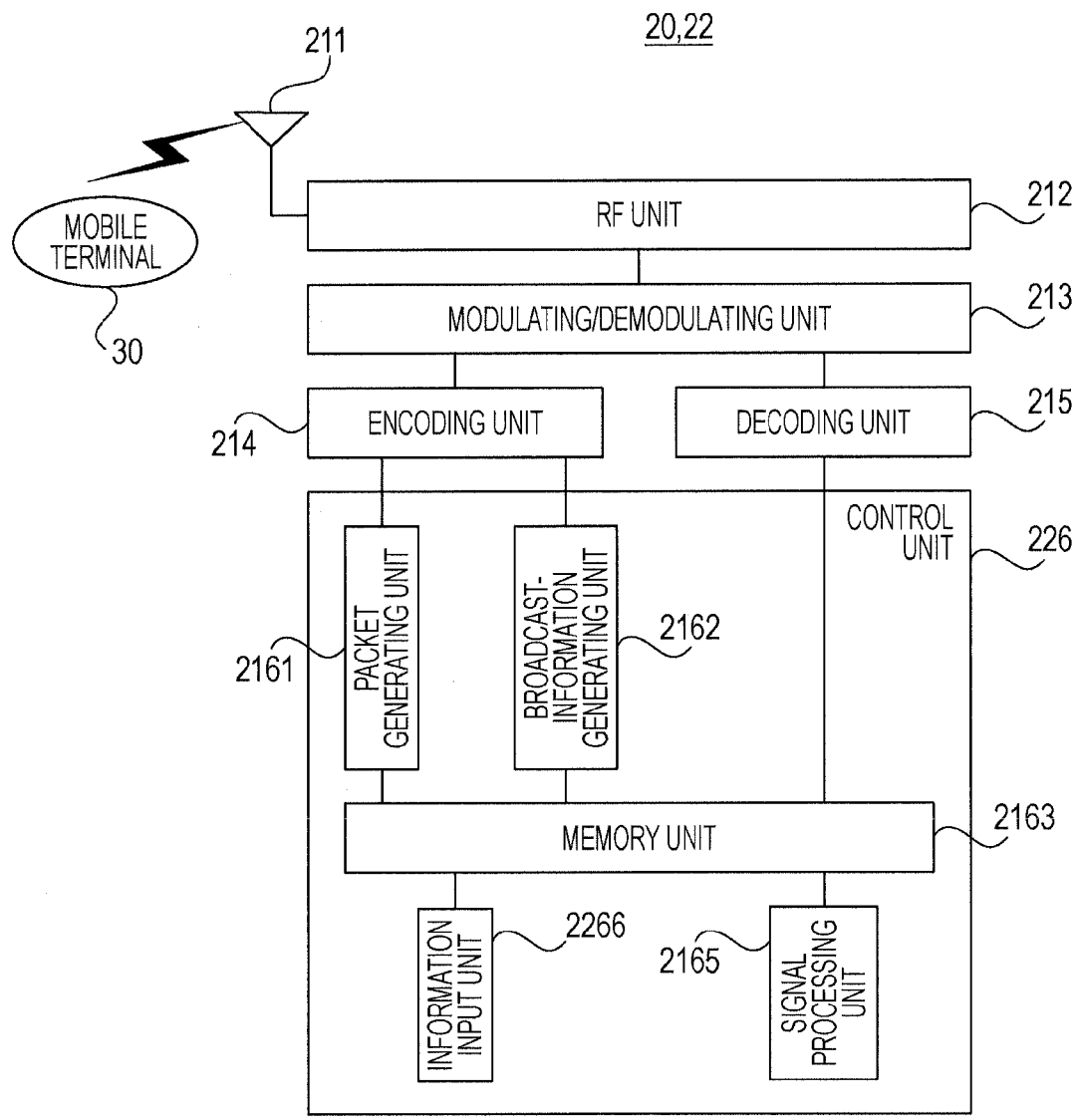
FIG. 9 is a diagram illustrating a configuration example of a wireless access station, according to a second embodiment.

FIG. 9 is a diagram illustrating a configuration example of a wireless access station, according to a second embodiment.

As illustrated in FIG. 9, the wireless AP 22 according to the second embodiment includes an antenna 211, an RF unit 212, a modulating/demodulating unit 213, an encoding unit 214, a decoding unit 215, and a control unit 226 just like the wireless AP 21 according to the first embodiment. The control unit 226 according to the second embodiment includes a packet generating unit 2161, a broadcast-information generating unit 2162, a memory unit 2163, and a signal processing unit 2165 just like the control unit 216 according to the first embodiment.

The wireless AP 22 according to the second embodiment differs from the wireless AP 21 according to the first embodiment in that the wireless AP 22 does not include the sensor 2164 but includes an information input unit 2266.

The information input unit 2266 inputs information used for broadcasting (i.e., source information, such as special sale information and congestion information described later) to the wireless AP 22. The information input unit 2266 may be, for example, various input devices that can be operated by an operator (e.g., a keyboard and a mouse). In this case, the original information is input by an operator. Alternatively, the information input unit 2266 may be a computing device that appropriately generates the source information in accordance with external input (e.g., input by an operator and a detection result of a sensor attached outside or inside the wireless AP 22).

(2-2) Operations of Wireless Communication System

Figure 10:
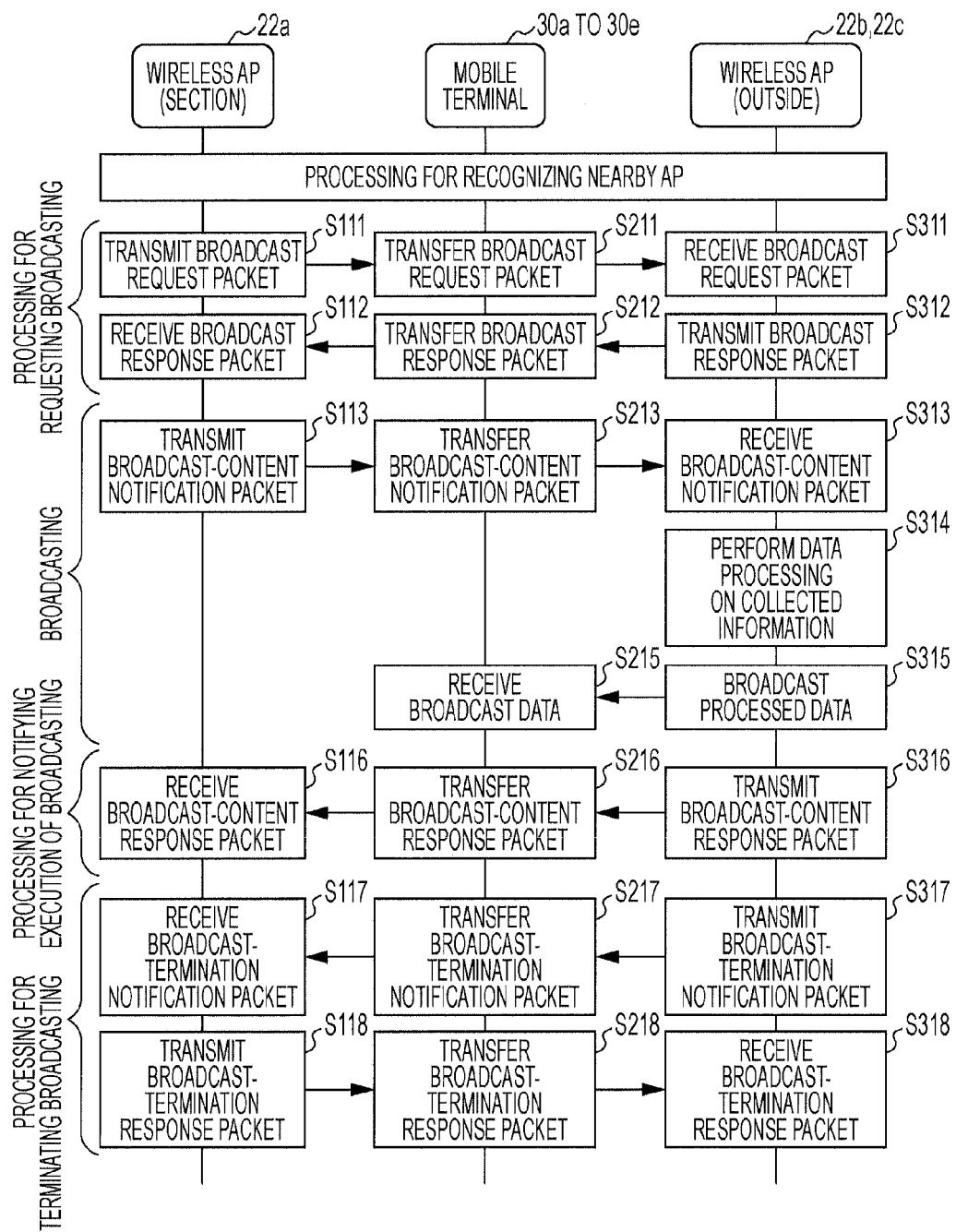
FIG. 10 is a diagram illustrating an example of an operational sequence performed by a wireless communication system, according to a second embodiment.

Operations of the wireless communication system 2 according to the second embodiment will be described with reference to FIGS. 10 and 11A to 11F. FIG. 10 is a diagram illustrating an example of an operational sequence performed by a wireless communication system, according to a second embodiment, in which a predetermined procedure of packet transfer is performed between two wireless access stations. FIGS. 11A to 11F are diagrams each illustrating an example of a packet format used for performing a predetermined procedure of packet transfer, according to a second embodiment.

Regarding the wireless communication system 2 according to the second embodiment, an exemplary application is expected in which one wireless AP 22 (e.g., wireless AP 22a installed around one section of a large commercial facility) requests another wireless AP 22 (e.g., wireless AP 22b or 22c installed outside the large commercial facility) to perform broadcasting and transfers source information to be broadcast to the another wireless AP 22. The description will be given below for an example in which the wireless AP 22a is installed around one section of a large commercial facility and the wireless AP 22b is installed outside the large commercial facility.

The description will be also given below for an example in which the wireless AP 22a transmits source information input by the information input unit 2266 thereof (e.g., special sale information indicating items sold at special prices in the section and congestion information indicating a congestion state of the section) to the wireless AP 22b and the wireless AP 22b provides users with the source information by broadcasting the special sale information, the congestion information, and so forth.

In this application, the broadcasting wireless AP 22 (e.g., the wireless AP 22b installed outside the large commercial facility) does not have to include the information input unit 2266. On the other hand, the non-broadcasting wireless AP 22 (e.g., the wireless AP 22a installed around the section of the large commercial facility) does not have to include the broadcast-information generating unit 2162.

As illustrated in FIG. 10, in the second embodiment, the wireless AP 22a performs processing for causing the other wireless AP 22b to recognize the presence of the wireless AP 22a and processing for recognizing the other wireless APs 22b and 22c, in a manner similar to the first embodiment.

In a sequence of operations S111, S211, S311, S312, S212, and S112, the wireless AP 22a performs processing for requesting the other wireless AP 22b to perform broadcasting.

More specifically, in operation S111, the package generating unit 2161 of the wireless AP 22a generates a broadcast request packet for requesting the other wireless AP 22b to perform broadcasting, and transmits the generated broadcast request packet to a mobile terminal 30 located in a coverage area 29a of the wireless AP 22a.

As illustrated in FIG. 11A, the broadcast request packet includes a packet ID field, a packet type field, a request-source AP_ID field indicating a wireless AP 22 serving as a source (transmission source) of the request packet, a request-destination AP_ID field indicating a wireless AP 22 serving as a destination (transmission destination) of the request packet, and a payload field. In the example illustrated in FIG. 11A, "0" is stored in the packet ID field, an identification number "#6" indicating that the type of this packet is the broadcast request packet is stored in the packet type field, an AP_ID of the wireless AP 22a serving as the request source of the broadcast request packet is stored in the request-source AP_ID field, an AP_ID of the wireless AP 22b serving as the request destination of the broadcast request packet is stored in the request-destination AP_ID field, and given information or no information may be stored in the payload field.

Referring back to FIG. 10, in operation S211, the mobile terminal 30 transfers, to the other wireless AP 22b, the broadcast request packet transmitted from the wireless AP 22*a*. This transfer may be performed in the same way as the transfer in operations S201 to S209 of the mobile terminal 30 in FIG. 7.

In operation S311, the signal processing unit 2165 of the wireless AP 22*b* receives the broadcast request packet transmitted (i.e., transferred) from the mobile terminal 30 being located in a coverage area 29*b* of the wireless AP 22*b*. When the AP_ID stored in the request-destination AP_ID field of the received broadcast request packet does not match the AP_ID of the wireless AP 22*b*, the signal processing unit 2165 of the wireless AP 22*b* may discard the received broadcast request packet. On the other hand, when the AP_ID stored in the request-destination AP_ID field of the received broadcast request packet matches the AP_ID of the wireless AP 22*b*, the signal processing unit 2165 of the wireless AP 22*b* controls the packet generating unit 2161 of the wireless AP 22*b* so that a broadcast response packet serving as a response message is generated. As a result, the packet generating unit 2161 of the wireless AP 22*b* generates the broadcast response packet (in operation S312). The packet generating unit 2161 of the wireless AP 22*b* then transmits the generated broadcast response packet to the mobile terminal 30 being located in a coverage area 29*b* of the wireless AP 22*b* (in operation S312).

As illustrated in FIG. 11B, the broadcast response packet includes a packet ID field, a packet type field, a response-source AP_ID field indicating a wireless AP 22 serving as a source (transmission source) of the response packet, a response-destination AP_ID field indicating a wireless AP 22 serving as a destination (transmission destination) of the response packet, and a payload field storing an identifier for identifying a broadcast request packet to be responded. In the example illustrated in FIG. 11B, "1" is stored in the packet ID field, an identification number "#7" indicating that the type of this packet is the broadcast response packet is stored in the packet type field, the AP_ID of the wireless AP 22*b* serving as the response source of the broadcast response packet is stored in the response-source AP_ID field, the AP_ID of the wireless AP 22*a* serving as the response destination of the broadcast response packet is stored in the response-destination AP_ID field, and an identifier identifying a broadcast request packet to be responded (e.g., a packet ID included in the received broadcast request packet) is stored in the payload field.

Referring again to FIG. 10, in operation S212, the mobile terminal 30 then transfers, to the wireless AP 22*a*, the broadcast response packet transmitted from the wireless AP 22*b*. This transfer may be performed in the same way as the transfer in operations S201 to S209 and operation S211 of mobile terminal 30.

In operation S112, the signal processing unit 2165 of the wireless AP 22*a* then receives the broadcast response packet transmitted (i.e., transferred) from the mobile terminal 30 being located an coverage area 29*a* of the wireless AP 22*a*. When the AP_ID stored in the response-destination AP_ID field of the received broadcast response packet does not match the AP_ID of the wireless AP 22*a*, the signal processing unit 2165 of the wireless AP 22*a* may discard the received broadcast response packet. In this case, the packet generating unit 2161 of the wireless AP 22*a* preferably transmits the broadcast request packet again after predetermined time. On the other hand, when the AP_ID stored in the response-destination AP_ID field of the received broadcast response packet matches the AP_ID of the wireless AP 22*a*, the signal processing unit 2165 of the wireless AP 22*a* determines whether or not the received broadcast response packet is a response message for the broadcast request packet transmitted in operation S111 with reference to the payload field of the received broadcast response packet. When the received broadcast response packet is not a response message for the broadcast request packet transmitted in operation S111, the packet generating unit 2161 of the wireless AP 22*a* preferably transmits the broadcast request packet again after predetermined time. The packet generating unit 2161 of the wireless AP 22*a* also preferably transmits the broadcast request packet again after predetermined time when the broadcast response packet does not arrive at the wireless AP 22*a*.

When the received broadcast response packet is a response message for the broadcast request packet transmitted in operation S111, the wireless AP 22*a* performs processing for causing the wireless AP 22*b* to broadcast desired source information to be broadcast (e.g., the special sale information and the congestion information input by the information input unit 2266) (in a sequence of operations S113, S213, S313, S314, S315, and S215).

More specifically, in operation S113, the packet generating unit 2161 of the wireless AP 22*a* generates a broadcast-content notification packet for notifying the other wireless AP 22*b* of desired source information to be broadcast, and transmits the generated broadcast-content notification packet to the mobile terminal 30 being located in the coverage area 29*a* of the wireless AP 22*a*.

As illustrated in FIG. 11C, the broadcast-content notification packet includes a packet ID field, a packet type field, a notification-source AP_ID field indicating a wireless AP 22 serving as a source (transmission source) of the notification packet, a notification-destination AP_ID field indicating a wireless AP 22 serving as a destination (transmission destination) of the notification packet, and a payload field storing the desired original information to be broadcast. In the example illustrated in FIG. 11C, "2" is stored in the packet ID field, an identification number "#8" indicating that the type of this packet is the broadcast-content notification packet is stored in the packet type field, the AP_ID of the wireless AP 22*a* serving as the notification source of the broadcast-content notification packet is stored in the notification-source AP_ID field, the AP_ID of the wireless AP 22*b* serving as the notification destination of the broadcast-content notification packet is stored in the notification-destination AP_ID field, and special sale information indicating items sold at special prices and congestion information indicating the congestion state are stored in the payload field as the desired source information to be broadcast. Additionally, a "broadcasting period" that specifies a period during which broadcasting is performed may be stored in the payload field.

Referring again to FIG. 10, in operation S213, the mobile terminal 30 transfers, to the wireless AP 22*b*, the broadcast-content notification packet transmitted from the wireless AP 22*a*. This transfer may be performed in the same way as the transfer in operations S201 to S209 and operations S211 and S212 described above.

In operation S313, the signal processing unit 2165 of the wireless AP 22*b* receives the broadcast-content notification packet transmitted (i.e., transferred) from the mobile terminal 30 being located in a coverage area 29*b* of the wireless AP 22*b*. When the AP_ID stored in the notification-destination AP_ID field of the received broadcast-content notification packet does not match the AP_ID of the wireless AP 22*b*, the signal processing unit 2165 of the wireless AP 22*b* may discard the received broadcast-content notification packet. On the other hand, when the AP_ID stored in the notification-destination AP_ID field of the received broadcast-content notification packet matches the AP_ID of the wireless AP 22*b*, the signal processing unit 2165 of the wireless AP 22*b* refers to the payload field of the received broadcast-content notification packet, thereby acquiring the source information. At this time, the signal processing unit 2165 of the wireless AP 22b preferably notifies the broadcast-information generating unit 2162 of the broadcasting period and so forth stored in the payload field of the broadcast-content notification packet received in operation S313.

In operation S314, the signal processing unit 2165 of the wireless AP 22b performs a predetermined data processing on the acquired source information by converting the acquired source information into broadcast information having a format for broadcasting.

In operation S315, the broadcast-information generating unit 2162 of the wireless AP 22b provides users with the source information by broadcasting the broadcast information to the coverage area 29b of the wireless AP 22b.

Operations S314 and S315 may be performed in the same manner as operations S107 and S110 illustrated in FIG. 7. The broadcast information is preferably broadcast continuously, intermittently, or non-intermittently during a period specified by the broadcasting period stored in the payload field of the broadcast-content notification packet.

As a result, in operation S215, the mobile terminal 30 being located in the coverage area 29b of the wireless AP 22b receives the broadcast information.

Further, in a sequence of operations S316, S216, and S116, every time broadcasting based on the received broadcast-content notification packet is performed, the signal processing unit 2165 of the wireless AP 22b performs processing for notifying the wireless AP 22a that the broadcasting is performed.

More specifically, in operation S316, the packet generating unit 2161 of the wireless AP 22b generates a broadcast-content response packet for notifying the wireless AP 22a that broadcasting is performed every time broadcasting based on the received broadcast-content notification packet is performed, and transmits the generated broadcast-content response packet to the mobile terminal 30 being located in the coverage area 29b of the wireless AP 22b.

Here, as illustrated in FIG. 11D, the broadcast-content response packet includes a packet ID field, a packet type field, a response-source AP_ID field indicating a wireless AP 22 serving as a source (transmission source) of the response packet, a response-destination AP_ID field indicating a wireless AP 22 serving as a destination (transmission destination) of the response packet, and a payload field storing an identifier for identifying a broadcast-content notification packet to be responded. In the example illustrated in FIG. 11D, "3" is stored in the packet ID field, an identification number "#9" indicating that the type of this packet is the broadcast-content response packet is stored in the packet type field, the AP_ID of the wireless AP 22b serving as the response source of the broadcast-content response packet is stored in the response-source AP_ID field, the AP_ID of the wireless AP 22a serving as the response destination of the broadcast-content response packet is stored in the response-destination AP_ID field, and an identifier identifying a broadcast-content notification packet to be responded (e.g., a packet ID included in the received broadcast-content notification packet) is stored in the payload field.

Referring again to FIG. 10, in operation S216, the mobile terminal 30 then transfers, to the wireless AP 22a, the broadcast-content response packet transmitted from the wireless AP 22b. This transfer may be performed in the same way as the transfer in operations S201 to S209 and operations S211 to S213 described above.

In operation S116, the signal processing unit 2165 of the wireless AP 22a receives the broadcast-content response packet transmitted (i.e., transferred) from the mobile terminal 30 being located in a coverage area 29a of the wireless AP 22a. When the AP_ID stored in the response-destination AP_ID field of the received broadcast-content response packet does not match the AP_ID of the wireless AP 22a, the signal processing unit 2165 of the wireless AP 22a may discard the received broadcast-content response packet. In this case, the packet generating unit 2161 of the wireless AP 22a preferably transmits the broadcast-content notification packet again after predetermined time. On the other hand, when the AP_ID stored in the response-destination AP_ID field of the received broadcast-content response packet matches the AP_ID of the wireless AP 22a, the signal processing unit 2165 of the wireless AP 22a determines whether or not the received broadcast-content response packet is a response message for the broadcast-content notification packet transmitted in operation S113 with reference to the payload field of the received broadcast-content response packet. When the received broadcast-content response packet is not a response message for the broadcast-content notification packet transmitted in operation S113, the packet generating unit 2161 of the wireless AP 22a preferably transmits the broadcast-content notification packet again after predetermined time. The packet generating unit 2161 of the wireless AP 22a also preferably transmits the broadcast-content notification packet again after predetermined time when the broadcast-content response packet does not arrive at the wireless AP 22a.

When the received broadcast-content response packet is a response message for the broadcast-content notification packet transmitted in operation S113, the wireless AP 22a recognizes that broadcasting based on the broadcast-content notification packet transmitted in operation S113 has completed.

In a sequence of operations S317, S217, S117, S118, S218, and S318, the wireless AP 22b performs processing for terminating broadcasting.

More specifically, in operation S317, the packet generating unit 2161 of the wireless AP 22b generates a broadcast-termination notification packet for notifying the wireless AP 22a of termination of broadcasting after the broadcasting period stored in the payload field of the broadcast-content notification packet expires. Then, the packet generating unit 2161 of the wireless AP 22b transmits the generated broadcast-termination notification packet to the mobile terminal 30 being located in the coverage area 29b of the wireless AP 22b.

Here, as illustrated in FIG. 11E, the broadcast-termination notification packet includes a packet ID field, a packet type field, a notification-source AP_ID field indicating a wireless AP 22 serving as a source (transmission source) of the notification packet, a notification-destination AP_ID field indicating an wireless AP 22 serving as a destination (transmission destination) of the notification packet, and a payload field. In the example illustrated in FIG. 11E, "4" is stored in the packet ID field, an identification number "#10" indicating that the type of this packet is the broadcast-termination notification packet is stored in the packet type field, the AP_ID of the wireless AP 22b serving as the notification source of the broadcast-termination notification packet is stored in the notification-source AP_ID field, the AP_ID of the wireless AP 22a serving as the notification destination of the broadcast-termination notification packet is stored in the notification-destination AP_ID field, and given information or no information may be stored in the payload field.

Referring again to FIG. 10, in operation S217, the mobile terminal 30 then transfers, to the other wireless AP 22a, the broadcast-termination notification packet transmitted from the wireless AP 22b. This transfer may be performed in the same way as the transfer in operations S201 to S209 and operations S211 to S216 of mobile terminal 30 described above.

In operation S117, the signal processing unit 2165 of the wireless AP 22a receives the broadcast-termination notification packet transmitted (i.e., transferred) from the mobile terminal 30 being located in a cover area 29a of the wireless AP 22a. When the AP_ID stored in the notification-destination AP_ID field of the received broadcast-termination notification packet does not match the AP_ID of the wireless AP 22a, the signal processing unit 2165 of the wireless AP 22a may discard the received broadcast-termination notification packet. On the other hand, when the AP_ID stored in the notification-destination AP_ID field of the received broadcast-termination notification packet matches the AP_ID of the wireless AP 22a, the signal processing unit 2165 of the wireless AP 22a controls the packet generating unit 2161 of the wireless AP 22a so that a broadcast-termination response packet serving as a response message is generated.

As a result, in operation S118, the packet generating unit 2161 of the wireless AP 22a generates the broadcast-termination response packet, and transmits the generated broadcast-termination response packet to the mobile terminal 30 being located in the coverage area 29a of the wireless AP 22a.

Here, as illustrated in FIG. 11F, the broadcast-termination response packet includes a packet ID field, a packet type field, a response-source AP_ID field indicating a wireless AP 21 serving as a source (transmission source) of the response packet, a response-destination AP_ID field indicating a wireless AP 21 serving as a destination (transmission destination) of the response packet, and a payload field storing an identifier identifying a broadcast-termination notification packet to be responded. In the example illustrated in FIG. 11F, "5" is stored in the packet ID field, an identification number "#11" indicating that the type of this packet is the broadcast-termination response packet is stored in the packet type field, the AP_ID of the wireless AP 22a serving as the response source of the broadcast-termination response packet is stored in the response-source AP_ID field, the AP_ID of the wireless AP 22b serving as the response destination of the broadcast-termination response packet is stored in the response-destination AP_ID field, and an identifier identifying a broadcast-termination notification packet to be responded (e.g., a packet ID included in the received broadcast-termination notification packet) is stored in the payload field.

Referring again to FIG. 10, in operation S218, the mobile terminal 30 then transfers, to the wireless AP 22b, the broadcast-termination response packet transmitted from the wireless AP 22a. This transfer may be performed in the same way as the transfer in operations S201 to S209 and operations S211 to S217 of mobile terminal 30 as described above.

In operation S318, the signal processing unit 2165 of the wireless AP 22b receives the broadcast-termination response packet transmitted (i.e., transferred) from the mobile terminal 30 being located in a coverage area 29b of the wireless AP 22b. When the AP_ID stored in the response-destination AP_ID field of the received broadcast-termination response packet does not match the AP_ID of the wireless AP 22b, the signal processing unit 2165 of the wireless AP 22b may discard the received broadcast-termination response packet. On the other hand, when the AP_ID stored in the response-destination AP_ID field of the received broadcast-termination response packet matches the AP_ID of the wireless AP 22b, the signal processing unit 2165 of the wireless AP 22b recognizes that termination of broadcasting has completed.

As described above, in accordance with the wireless communication system 2 according to the second embodiment, advantages similar to those offered by the wireless communication system 1 according to the first embodiment may be favorably obtained.

(2-3) Modified Operation Example

Figure 12:
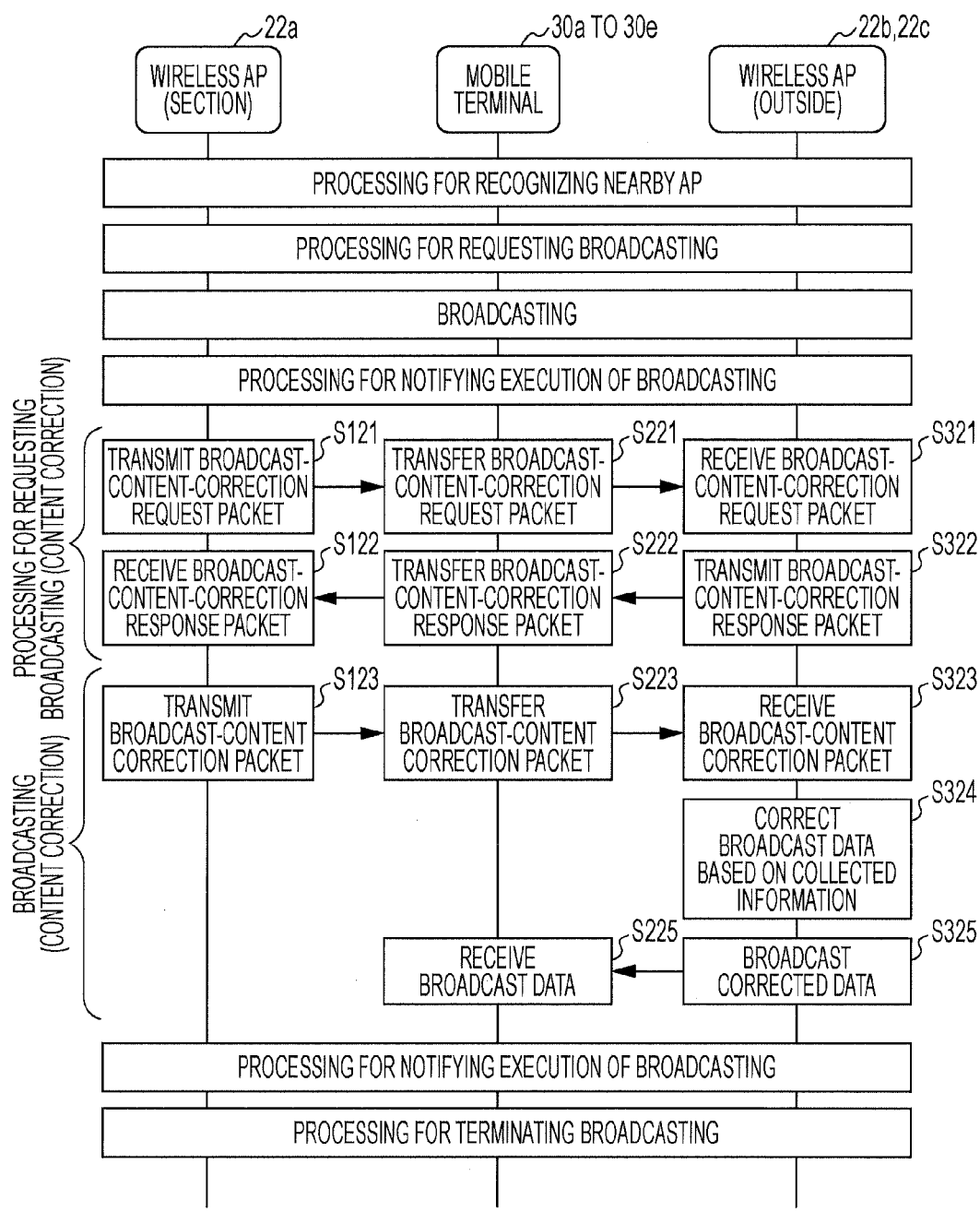
FIG. 12 is a diagram illustrating an example of an operational sequence performed by a wireless communication system, according to a modification of a second embodiment.

Modified operations of the wireless communication system 2 according to the second embodiment will be described with reference to FIGS. 12 and 13A to 13C. FIG. 12 is a diagram illustrating an example of an operational sequence performed by a wireless communication system, according to a modification of a second embodiment, in which a predetermined procedure of packet transfer is performed between two wireless access stations. FIGS. 13A to 13C are diagrams each illustrating an example of a packet format used for performing a predetermined procedure of packet transfer, according to a modification of a second embodiment.

As illustrated in FIG. 12, in the modified operation example, when the wireless AP 22a desires to correct the broadcast content (e.g., correction of the type of or the content of the desired source information to be broadcast and correction of the broadcasting period), processing for correcting the broadcast content is performed during the operations illustrated in FIG. 10.

As illustrated in FIG. 12, in a sequence of operations S121, S221, S321, S322, S222, and S122, the wireless AP 22a performs processing for requesting the other wireless AP 22b to correct the broadcast content.

More specifically, in operation S121, the packet generating unit 2161 of the wireless AP 22a generates a broadcast-content-correction request packet for requesting the other wireless AP 22b to correct the broadcast content, and transmits the generated broadcast-content-correction request packet to the mobile terminal 30 being located in the coverage area 29a of the wireless AP 22a.

Here, as illustrated in FIG. 13A, the broadcast-content-correction request packet includes a packet ID field, a packet type field, a request-source AP_ID field indicating a wireless AP 22 serving as a source (transmission source) of the request packet, a request-destination AP_ID field indicating a wireless AP 22 serving as a destination (transmission destination) of the request packet, and a payload field. In the example illustrated in FIG. 13A, "0" is stored in the packet ID field, an identification number "12" indicating that the type of this packet is the broadcast-content-correction request packet is stored in the packet type field, the AP_ID of the wireless AP 22a serving as the request source of the broadcast-content-correction request packet is stored in the request-source AP_ID field, the AP_ID of the wireless AP 22b serving as the request destination of the broadcast-content-correction request packet is stored in the request-destination AP_ID field, and given information or no information may be stored in the payload field.

Referring back to FIG. 12, in operation S221, the mobile terminal 30 then transfers, to the other wireless AP 22b, the broadcast-content-correction request packet transmitted from the wireless AP 22a. This transfer may be performed in the same way as the transfer in operations S201 to S209 and operations S211 to S218 of mobile terminal 30 as described above.

In operation S321, the signal processing unit 2165 of the wireless AP 22b receives the broadcast-content-correction request packet transmitted (i.e., transferred) from the mobile terminal 30 being located in a coverage area 29b of the wireless AP 22b. When the AP_ID stored in the request-destination AP_ID field of the received broadcast-content-correction request packet does not match the AP_ID of the wireless AP 22b, the signal processing unit 2165 of the wireless AP 22b may discard the received broadcast-content-correction request packet. On the other hand, when the AP_ID stored in the request-destination AP_ID field of the received broadcast-content-correction request packet matches the AP_ID of the wireless AP 22b, the signal processing unit 2165 of the wireless AP 22b controls the packet generating unit 2161 of the wireless AP 22b so that a broadcast-content-correction response packet serving as a response message is generated.

As a result, in operation S322, the packet generating unit 2161 of the wireless AP 22b generates the broadcast-content-correction response packet, and transmits the generated broadcast-content-correction response packet to the mobile terminal 30 being located in the coverage area 29b of the wireless AP 22b.

Here, as illustrated in FIG. 13B, the broadcast-content-correction response packet includes a packet ID field, a packet type field, a response-source AP_ID field indicating a wireless AP 22 serving as a source (transmission source) of the response packet, a response-destination AP_ID field indicating a wireless AP 22 serving as a destination (transmission destination) of the response packet, and a payload field storing an identifier identifying a broadcast-content-correction request packet to be responded. In the example illustrated in FIG. 13B, "1" is stored in the packet ID field, an identification number "#13" indicating that the type of this packet is the broadcast-content-correction response packet is stored in the packet type field, the AP_ID of the wireless AP 22b serving as the response source of the broadcast-content-correction response packet is stored in the response-source AP_ID field, the AP_ID of the wireless AP 22a serving as the response destination of the broadcast-content-correction response packet is stored in the response-destination AP_ID field, and an identifier identifying a broadcast-content-correction request packet to be responded (e.g., a packet ID included in the received broadcast-content-correction request packet) is stored in the payload field.

Referring again to FIG. 12, in operation S222, the mobile terminal 30 transfers, to the wireless AP 22a, the broadcast-content-correction response packet transmitted from the wireless AP 22b. This transfer may be performed in the same way as the transfer in operations S201 to S209, operations S211 to S218, and operation S221 of mobile terminal 30 as described above.

In operation 122, the signal processing unit 2165 of the wireless AP 22a receives the broadcast-content-correction response packet transmitted (i.e., transferred) from the mobile terminal 30 being located in a cover area 20a of the wireless AP 22a. When the AP_ID stored in the response-destination AP_ID field of the received broadcast-content-correction response packet does not match the AP_ID of the wireless AP 22a, the signal processing unit 2165 of the wireless AP 22a may discard the received broadcast-content-correction response packet. In this case, the packet generating unit 2161 of the wireless AP 22a preferably transmits the broadcast-content-correction request packet again after predetermined time. On the other hand, when the AP_ID stored in the response-destination AP_ID field of the received broadcast-content-correction response packet matches the AP_ID of the wireless AP 22a, the signal processing unit 2165 of the wireless AP 22a determines whether or not the received broadcast-content-correction response packet is a response message for the broadcast-content-correction request packet transmitted in operation S121 with reference to the payload field of the received broadcast-content-correction response packet. When the received broadcast-content-correction response packet is not a response message for the broadcast-content-correction request packet transmitted in operation S121, the packet generating unit 2161 of the wireless AP 22a preferably transmits the broadcast-content-correction request packet again after predetermined time. The packet generating unit 2161 also preferably transmits the broadcast-content-correction request packet again after predetermined time when the broadcast-content-correction response packet does not arrive.

When the received broadcast-content-correction response packet is a response message for the broadcast-content-correction request packet transmitted in operation S121, the wireless AP 22a performs processing for causing the other wireless AP 22b to broadcast the corrected original information (in a sequence of operations S123, S223, S323, S324, S325, and S225).

More specifically, in operation S123, the packet generating unit 2161 of the wireless AP 22a generates a broadcast-content correction packet for notifying the other wireless AP 22b of items of the broadcast content to be corrected (or the corrected broadcast content), and transmits the generated broadcast-content correction packet to the mobile terminal 30 being located in the coverage area 29a of the wireless AP 22a.

Here, as illustrated in FIG. 13C, the broadcast-content correction packet includes a packet ID field, a packet type field, a notification-source AP_ID field indicating a wireless AP 22 serving as a source (transmission source) of the correction packet, a notification-destination AP_ID field indicating a wireless AP 22 serving as a destination (transmission destination) of the correction packet, and a payload field storing the corrected broadcast content. In the example illustrated in FIG. 13C, "2" is stored in the packet ID field, an identification number "#14" indicating that the type of this packet is the broadcast-content correction packet is stored in the packet type field, the AP_ID of the wireless AP 22a serving as the notification source of the broadcast-content correction packet is stored in the notification-source AP_ID field, the AP_ID of the wireless AP 22b serving as the notification destination of the broadcast-content correction packet is stored in the notification-destination AP_ID field, and the corrected source information (e.g., corrected special sale information and corrected congestion information) and the corrected "broadcasting period" may be stored in the payload field.

Referring again to FIG. 12, in operation S223, the mobile terminal 30 transfers, to the wireless AP 22b, the broadcast-content correction packet transmitted from the wireless AP 22a. This transfer may be performed in the same way as the transfer in operations S201 to S209, operations S211 and S218, and operations S221 and S222 of mobile terminal 30 that have been described above.

In operation S323, the signal processing unit 2165 of the wireless AP 22b receives the broadcast-content correction packet transmitted (i.e., transferred) from the mobile terminal 30 being located in a coverage area 20b of the wireless AP 22b. When the AP_ID stored in the notification-destination AP_ID field of the received broadcast-content correction packet does not match the AP_ID of the wireless AP 22b, the signal processing unit 2165 of the wireless AP 22b may discard the received broadcast-content correction packet. On the other hand, when the AP_ID stored in the notification-destination AP_ID field of the received broadcast-content correction packet matches the AP_ID of the wireless AP 22b, the signal processing unit 2165 of the wireless AP 22b refers to the payload field of the received broadcast-content correction packet, thereby acquiring the corrected source information or the like (in operation S324).

In operation S325, the wireless AP 22b performs broadcasting based on the corrected source information or the like.

In accordance with the modified operation example, the broadcast content may be favorably corrected and advantages similar to those offered by the wireless communication system 2 according to the aforementioned second embodiment may be favorably obtained.

(3) Third Embodiment

A wireless communication system 3 according to a third embodiment will be described with reference to FIGS. 14, 15, 16A, 16B, and 17. The wireless communication system 3 according to the third embodiment differs, in a configuration and operations of a wireless AP 20, from the wireless communication system 1 according to the first embodiment and the wireless communication system 2 according to the second embodiment. Other than the configuration and operations of the wireless AP 20, the wireless communication system 3 according to the third embodiment may be the same as or may be different from the wireless communication system 1 according to the first embodiment or the wireless communication system 2 according to the second embodiment. For simplicity of explanation, the description will be given below for the configuration and operations of the wireless AP 20 according to the third embodiment that are different from those of the wireless communication system 1 according to the first embodiment or the wireless communication system 2 according to the second embodiment.

In order to distinguish the wireless AP 20 according to the third embodiment from those according to the first and second embodiments, the wireless AP 20 according to the third embodiment is denoted as a "wireless AP 23" below.

(3-1) Configuration of Wireless AP

A configuration of the wireless AP 23 according to a third embodiment will be described with reference to FIG. 14.

Figure 14:
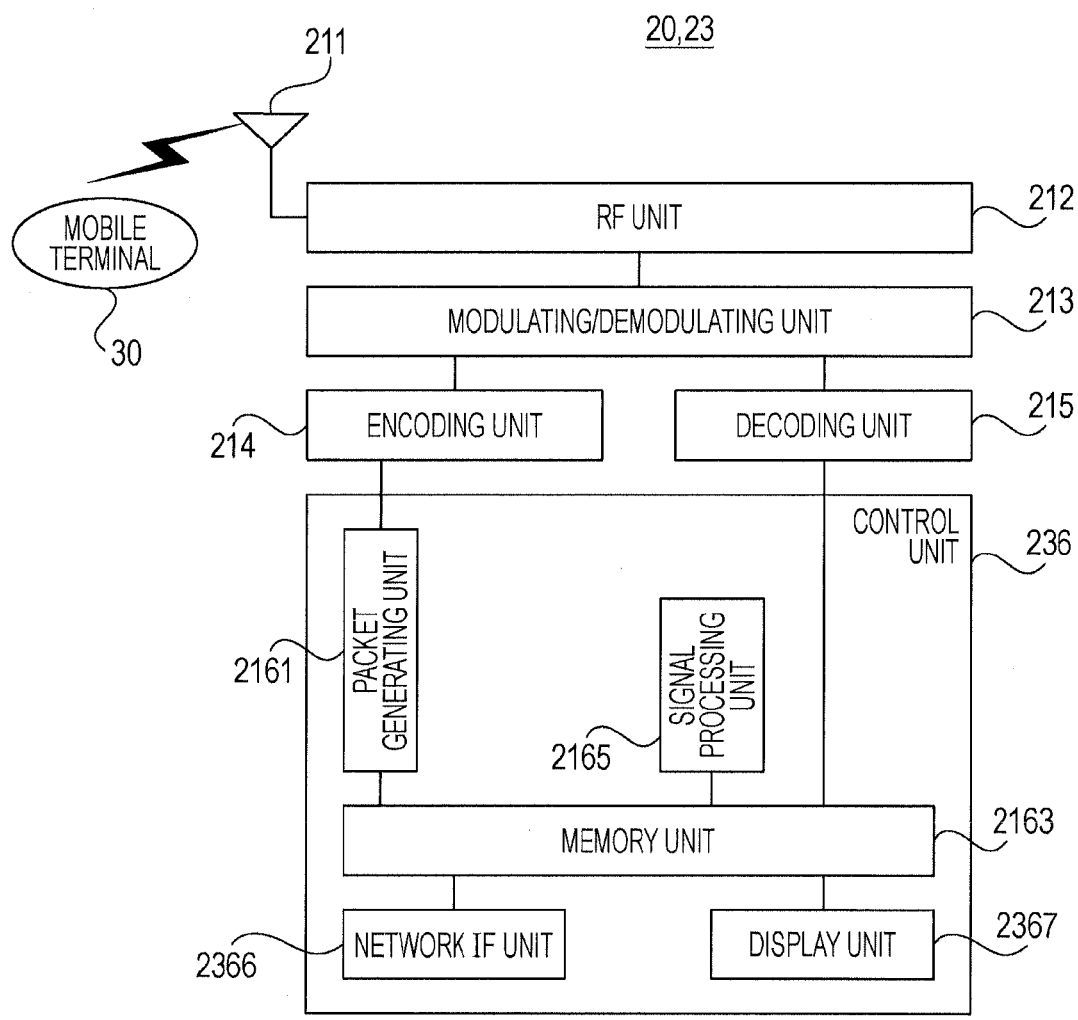
FIG. 14 is a diagram illustrating a configuration example of a wireless access station, according to a third embodiment.

FIG. 14 is a diagram illustrating a configuration example of a wireless access station, according to a third embodiment.

As illustrated in FIG. 14, the wireless AP 23 according to the third embodiment may be configured to include an antenna 211, an RF unit 212, a modulating/demodulating unit 213, an encoding unit 214, a decoding unit 215, and a control unit 236 just like the wireless AP 21 according to the first embodiment or the wireless AP 22 according to the second embodiment. The control unit 236 according to the third embodiment includes a packet generating unit 2161, a memory unit 2163, and a signal processing unit 2165 just like the control unit 216 according to the first embodiment or the control unit 226 according to the second embodiment.

The wireless AP 23 according to the third embodiment differs from the wireless AP 21 according to the first embodiment or the wireless AP 22 according to the second embodiment in that the wireless AP 23 does not include the broadcast-information generating unit 2162 and the sensor 2164 but includes a network interface (IF) unit 2366 and a display device 2367.

The network IF unit 2366 is an interface device that terminates a wired or wireless network. The network IF unit 2366 acquires specific information (e.g., advertisement information described later) from external devices via a wired or wireless network.

The display device 2367 displays specific information (e.g., advertisement information described later).

(3-2) Operations of Wireless Communication System

Operations of the wireless communication system 3 according to a third embodiment will be described with reference to FIGS. 15, 16A, and 16B.

Figure 15:
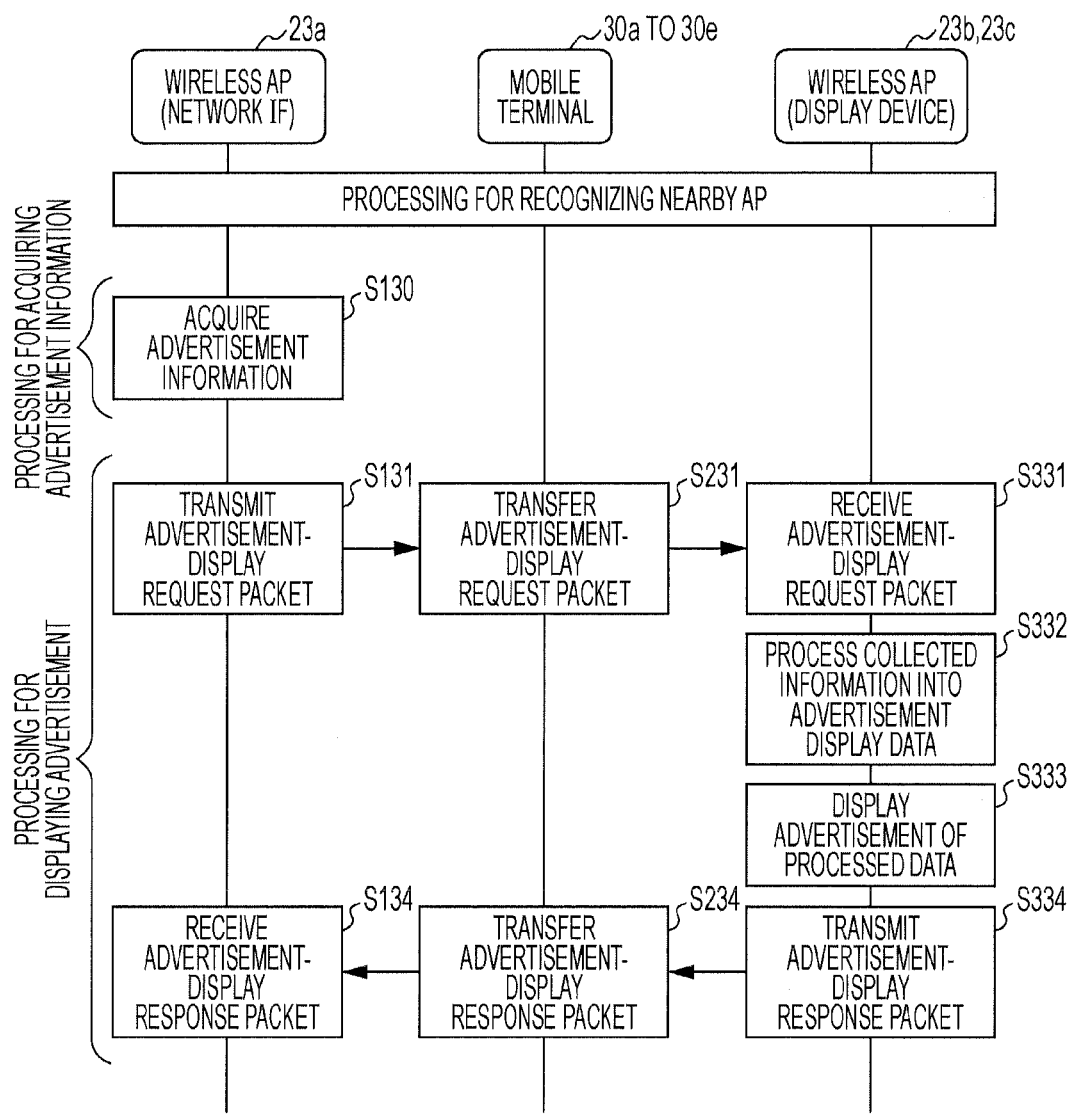
FIG. 15 is a diagram illustrating an example of an operational sequence performed by a wireless communication system, according to a third embodiment.

FIG. 15 is a diagram illustrating an example of an operational sequence performed by a wireless communication system, according to a third embodiment, in which a predetermined procedure of packet transfer is performed between two wireless access stations.

FIGS. 16A and 16B are diagrams each illustrating an example of a packet format used for performing a predetermined procedure of packet transfer, according to a third embodiment.

Regarding the wireless communication system 3 according to the third embodiment, an exemplary application is expected in which one wireless AP 23 acquires advertisement information via the network IF unit 2366 and transmits the acquired advertisement information to other wireless APs 23, and the other wireless APs 23 actually display an advertisement. The description will be given below for such an exemplary application.

In this application, the wireless APs 23 that actually display an advertisement do not have to include the network IF unit 2366. On the other hand, the wireless AP 23 that does not actually display an advertisement (i.e., that requests the other wireless APs to display the advertisement by transmitting the advertisement information) does not have to include the display device 2367.

As illustrated in FIG. 15, also in the third embodiment, a wireless AP 23a performs processing for causing another wireless AP 23b to recognize the presence of the wireless AP 23a and processing for recognizing the other wireless APs 23b and 23c.

In operation S130, the wireless AP 23a acquires advertisement information as source information to be provided for users. For example, the network IF unit 2366 of the wireless AP 23a acquires advertisement information from an external device or a server via a network connected to the network IF unit 2366. The network IF unit 2366 of the wireless AP 23a temporarily stores the acquired advertisement information in the memory unit 2163.

Thereafter, in a sequence of operations S131, S231, S331, S332, S333, S334, S234, and S134, the wireless AP 23a performs processing for requesting the other wireless AP 23b to provide the users with the source information by display an advertisement of the advertisement information acquired in operation S130.

More specifically, in operation S131, the package generating unit 2161 of the wireless AP 23a generates an advertisement-display request packet for requesting the other wireless AP 23b to display an advertisement, and transmits the generated advertisement-display request packet to a mobile terminal 30 being located in a coverage area 29a of the wireless AP 23a.

Here, as illustrated in FIG. 16A, the advertisement-display request packet includes a packet ID field, a packet type field, a request-source AP_ID field indicating a wireless AP 23 serving as a source (transmission source) of the request packet, a request-destination AP_ID field indicating a wireless AP 23 serving as a destination (transmission destination) of the request packet, and a payload field storing, as source information to be provided for users, desired advertisement information to be displayed. In the example illustrated in FIG.

16A, "0" is stored in the packet ID field, an identification number "#15" indicating that the type of this packet is the advertisement-display request packet is stored in the packet type field, an AP_ID of the wireless AP 23a serving as the request source of the advertisement-display request packet is stored in the request-source AP_ID field, an AP_ID of the wireless AP 23b serving as the request destination of the advertisement-display request packet is stored in the request-destination AP_ID field, and desired advertisement information to be displayed (i.e., the advertisement information acquired and temporarily stored in the memory unit 2163 in operation S130) is stored in the payload field.

Additionally, an "advertisement display period" that specifies a period of displaying the advertisement may be stored in the payload field.

The advertisement information stored in the payload field may be encrypted to ensure the confidentiality. In this case, the packet generating unit 2161 of the wireless AP 23a preferably generates the advertisement-display request packet while encrypting the advertisement information.

Referring again to FIG. 15, in operation S231, the mobile terminal 30 then transfers, to the other wireless AP 23b, the advertisement-display request packet transmitted from the wireless AP 23a. This transfer may be performed in the same way as the transfer in operations S201 and S209, operations S211 to S218, and operations S221 to S223 that have been described above.

In operation S331, the signal processing unit 2165 of the wireless AP 23b receives the advertisement-display request packet transmitted (i.e., transferred) from the mobile terminal 30 being located in a coverage area 29b of the wireless AP 23b. When the AP_ID stored in the request-destination AP_ID field of the received advertisement-display request packet does not match the AP_ID of the wireless AP 23b, the signal processing unit 2165 of the wireless AP 23b may discard the received advertisement-display request packet. On the other hand, when the AP_ID stored in the request-destination AP_ID of the received advertisement-display request packet matches the AP_ID of the wireless AP 23b, the signal processing unit 2165 of the wireless AP 23b refers to the payload field of the received advertisement-display request packet, thereby acquiring the advertisement information as source information to be provided for users.

In operation S332, the signal processing unit 2165 of the wireless AP 23b performs a predetermined data processing on the acquired advertisement information (source information) by converting the acquired advertisement information into advertisement display information having a format for display, and stores the advertisement display information resulting from the conversion in the memory unit 2163.

When the advertisement information stored in the payload field of the received advertisement-display request packet is encrypted, the signal processing unit 2165 of the wireless AP 23b preferably acquires the advertisement information by performing decryption.

In operation S333, the display device 2367 of the wireless AP 23b reads out the advertisement display information stored in the memory unit 2163, and provides users with the advertise display information by displaying an advertisement based on the advertisement display information.

When the "advertisement display period" is stored in the payload field of the received advertisement-display request packet, the display device 2367 of the wireless AP 23b preferably displays the advertisement continuously, intermittently, or non-intermittently during a period specified by the advertisement display period.

Additionally, every time the advertisement based on the received advertisement-display request packet is displayed, the signal processing unit 2165 of the wireless AP 23b performs processing for notifying the wireless AP 23a that the advertisement is displayed (in operations S334, S234, and S134).

More specifically, in operation S334, every time the advertisement based on the received advertisement-display request packet is displayed, the packet generating unit 2161 of the wireless AP 23b generates an advertisement-display response packet for notifying the wireless AP 23a that the advertisement is displayed. Then the packet generating unit 2161 of the wireless AP 23b transmits the generated advertisement-display response packet to the mobile terminal 30 being located in a coverage area 29b of the wireless AP 23b.

Here, as illustrated in FIG. 16B, the advertisement-display response packet includes a packet ID field, a packet type field, an response-source AP_ID field indicating a wireless AP 23 serving as a source (transmission source) of the response packet, a response-destination AP_ID field indicating a wireless AP 23 serving as a destination (transmission destination) of the response packet, and a payload field storing an identifier for uniquely identifying a advertisement-display request packet to be responded. In the example illustrated in FIG. 16B, "1" is stored in the packet ID field, an identification number "#16" indicating that the type of this packet is the advertisement-display response packet is stored in the packet type field, the AP_ID of the wireless AP 23b serving as the response source of the advertisement-display response packet is stored in the response-source AP_ID field, the AP_ID of the wireless AP 23a serving as the response destination of the advertisement-display response packet is stored in the response-destination AP_ID field, and an identifier identifying an advertisement-display request packet to be responded (e.g., a packet ID included in the received advertisement-display request packet) is stored in the payload field.

Additionally, information indicating whether or not error-free advertisement information notified by the advertisement-display request packet is correctly received may be stored in the payload field of the advertisement-display response packet. For example, when the wireless AP 23b has correctly received the error-free advertisement information notified by the advertisement-display request packet, an acknowledge (ACK) flag indicating that reception result may be stored in the payload field of the advertisement-display response packet. For example, when the wireless AP 23b has failed to correctly receive the error-free advertisement information notified by the advertisement-display request packet, a negative acknowledge (NACK) flag indicating that reception result may be stored in the payload field of the advertisement-display response packet.

Referring again to FIG. 15, in operation S234, the mobile terminal 30 then transfers, to the wireless AP 23a, the advertisement-display response packet transmitted from the wireless AP 23b. This transfer may be performed in the same way as the transfer in operations S201 to S209, operations S211 to S218, operations S221 to S223, and operation S231 that have been described above.

In operation S134, the signal processing unit 2165 of the wireless AP 23a receives the advertisement-display response packet transmitted (i.e., transferred) from the mobile terminal 30 being located in a coverage area 29a of the wireless AP 23a. When the AP_ID stored in the response-destination AP_ID field of the received advertisement-display response packet does not match the AP_ID of the wireless AP 23a, the signal processing unit 2165 of the wireless AP 23a may discard the received advertisement-display response packet.

In this case, the packet generating unit 2161 of the wireless AP 23a preferably transmits the advertisement-display request packet again after predetermined time. On the other hand, when the AP_ID stored in the response-destination AP_ID field of the received advertisement-display response packet matches the AP_ID of the wireless AP 23a, the signal processing unit 2165 of the wireless AP 23a determines whether or not the received advertisement-display response packet is a response message for the advertisement-display request packet transmitted in operation S131 with reference to the payload field of the received advertisement-display response packet. When the received advertisement-display response packet is not a response message for the advertisement-display request packet transmitted in operation S131, the packet generating unit 2161 of the wireless AP 23a preferably transmits the advertisement-display request packet again after predetermined time. When the AP_ID stored in the response-destination AP_ID field of the received advertisement-display response packet matches the AP_ID of the wireless AP 23a, the signal processing unit 2165 of the wireless AP 23a also determines whether or not the advertisement information notified by the advertisement-display request packet transmitted in operation S131 is correctly received by the wireless AP 23b with reference to the payload field of the received advertisement-display response packet. When the advertisement information notified by the advertisement-display request packet transmitted in operation S131 is not correctly received by the wireless AP 23b, the packet generating unit 2161 of the wireless AP 23a preferably transmits the advertisement-display request packet again. The packet generating unit 2161 of the wireless AP 23a preferably transmits the advertisement-display request packet after predetermined time when the advertisement-display response packet does not arrive.

When the received advertisement-display response packet is a response message for the advertisement-display request packet transmitted in operation S131 and the advertisement information notified by the advertisement-display request packet transmitted in operation S131 is correctly received by the wireless AP 23b, the wireless AP 23a recognizes that displaying of the advertisement based on the advertisement-display request packet transmitted in operation S131 has completed.

As described above, in accordance with the wireless communication system 3 according to the third embodiment, advantages similar to those offered by the wireless communication system 1 according to the first embodiment or by the wireless communication system 2 according to the second embodiment may be obtained even if information is provided in a form other than broadcasting (i.e., in the example of the third embodiment, by displaying advertisement information).

(2-3) Modified Operation Example

Modified operations of the wireless communication system 3 according to the third embodiment will be described with reference to FIG. 17.

Figure 17:
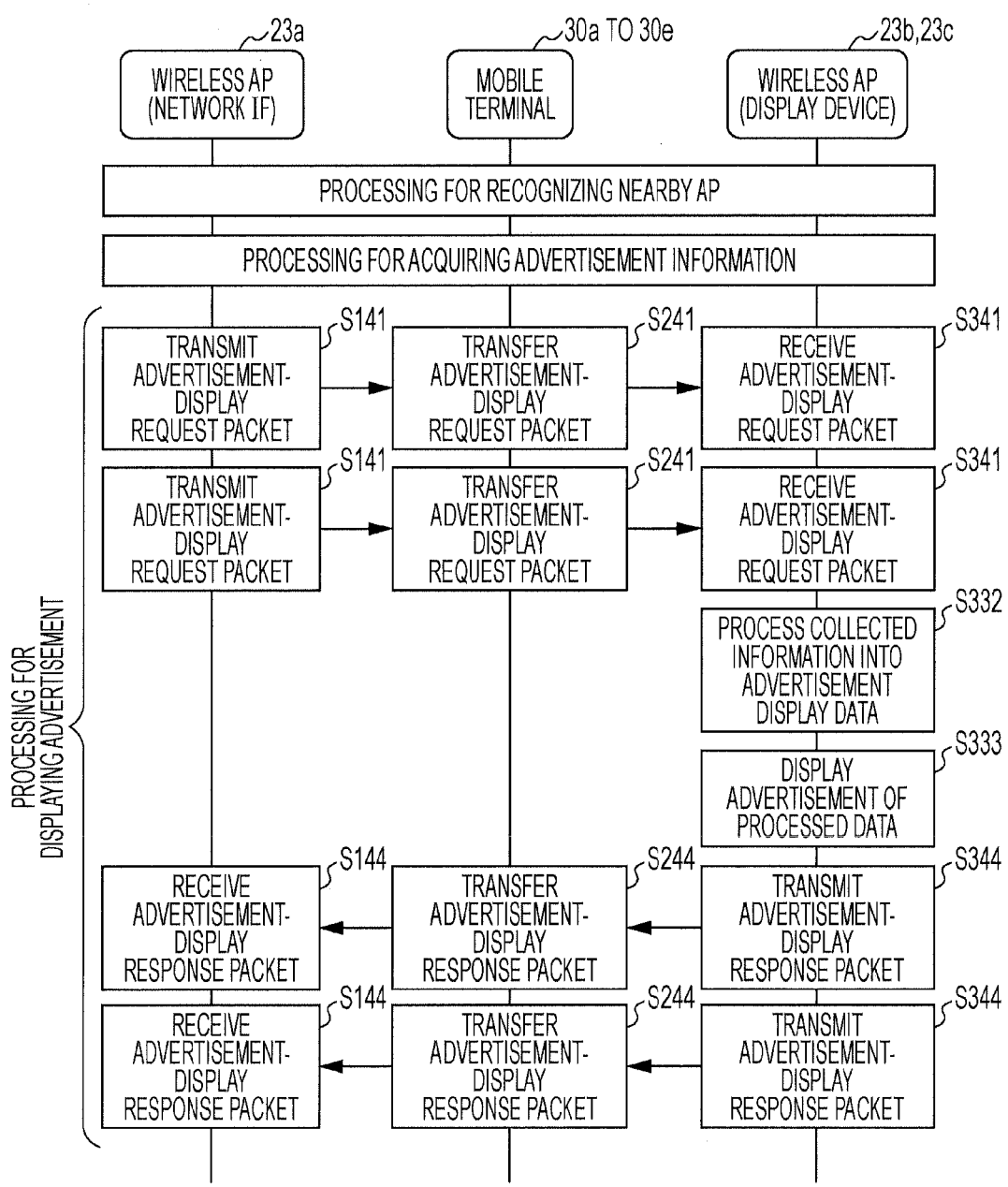
FIG. 17 is a diagram illustrating an example of an operational sequence performed by a wireless communication system, according to a modification of a third embodiment.

FIG. 17 is a diagram illustrating an example of an operational sequence performed by a wireless communication system, according to a modification of a third embodiment, in which a predetermined procedure of packet transfer is performed between two wireless access stations.

As illustrated in FIG. 17, in the modified operation example, the advertisement-display request packet is transmitted from the wireless AP 23a to the wireless AP 23b a plurality of times in a divided fashion. Additionally, the advertisement-display response packet is also transmitted from the wireless AP 23b to the wireless AP 23a a plurality of times in a divided fashion in response to the respective advertisement-display request packets transmitted in a divided fashion. Such divided transmission of advertisement-display request packet is preferably performed when an amount of advertisement information is relatively large.

In accordance with such a modified operation example, even when an amount of advertisement information is relatively large, advantages similar to those offered by the wireless communication system 3 according to the third embodiment may be favorably obtained.

The above-described wireless APs 20 (i.e., wireless APs 20 that exchange information with each other via the mobile terminals 30 and that provide specific information after performing data processing on acquired information) may be applied to various applications other than those described above in the first to third embodiments.

For example, in the case where a temperature sensor, a water quantity sensor, a water temperature sensor, and so forth are installed in an agricultural field, the wireless APs 20 may be installed in association with the respective sensors and another wireless AP 20 for collecting measurement result information (i.e., a temperature, a water quantity, a water temperature, etc.) from these wireless APs 20 may be installed. With such a configuration, states of the agricultural field may be collectively managed.

For example, the wireless APs 20 may be installed in association with an electric meter, a gas meter, and a water meter of each house and another wireless AP 20 for collecting measurement result information (i.e., an amount of electric power used, an amount of gas used, and an amount of water used) from these wireless APs 20 may be installed. With such a configuration, use states of electric power, gas, and water of each household may be collectively managed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A system for performing wireless communication between wireless access stations via a mobile terminal, comprising:

a first wireless access station to:
perform wireless communication with one or more mobile terminals being located in a coverage area of the first wireless access station, and
hold source information to be provided for one or more users;

a second wireless access station to:
perform wireless communication with one or more mobile terminals being located in a coverage area of the second wireless access station, the coverage area of the second wireless access station not overlapping with the coverage area of the first wireless access station,
acquire the source information from the first wireless access station,
perform a predetermined data processing on the acquired source information, and provide the one or more users with the source information on which the predetermined data processing has been performed; and at least one mobile terminal each having a memory, each of the at least one mobile terminal being configured to:
store, in the memory thereof, a packet received from one of the first and second wireless access stations when the each of the at least one mobile terminal is located in a coverage area of the one of the first and second wireless access stations, and
transmit the packet stored in the memory thereof to the other one of the first and second wireless access stations when the each of the at least one mobile terminal is located in a coverage area of the other one of the first and second wireless access stations, so that the packet is transferred between the first and second wireless access stations via the memory of the each of the at least one mobile terminal when the each of the at least one mobile terminal moves between coverage areas of the first and second wireless access stations, wherein
the second wireless access station acquires the source information from the first wireless access station by performing a predetermined procedure of packet transfer between the first and second wireless access stations via the memory of the at least one mobile terminal when the at least one mobile terminal moves between coverage areas of the first and second wireless access stations.

2. The system of claim 1, wherein
the predetermined procedure of packet transfer includes:
transferring an information-acquisition request packet for requesting the first wireless access station to acquire the source information, from the second wireless access station to the first wireless access station via a memory of a first mobile terminal included in the at least one mobile terminal when the first mobile terminal moves from a coverage area of the second wireless access station to a coverage area of the first wireless access station; and
transferring, in response to the information-acquisition request packet, a information notification packet including the source information, from the first wireless access station to the second wireless access station via a memory of a second mobile terminal included in the at least one mobile terminal when the second mobile terminal moves from a coverage area of the first wireless access station to a coverage area of the second wireless access station.

3. The system of claim 1, wherein
the predetermined procedure of packet transfer includes:
transferring an information-provision request packet for requesting the second wireless access station to provide the one or more users with the source information, from the first wireless access station to the second wireless access station via a memory of a first mobile terminal included in the at least one mobile terminal when the first mobile terminal moves from a coverage area of the first wireless access station to a coverage area of the second wireless access station; and
transferring an information notification packet including the source information, from the first wireless access station to the second wireless access station via a second mobile terminal included in the at least one mobile terminal when the second mobile terminal moves from a coverage area of the first wireless access station to a coverage area of the second wireless access station.

4. The system of claim 1, wherein
the second wireless access station provides the one or more users with the source information on which the predetermined data processing has been performed, by broadcasting the source information to one or more mobile terminals being located in a coverage area of the second wireless access station.

5. The system of claim 1, wherein
the wireless communication system includes a plurality of the first wireless access stations each holding a piece of the source information;
the second wireless access station
acquires plural pieces of the source information from the plurality of first wireless access stations,
performs the predetermined data processing on the acquired plural pieces of the source information, and
provides the one or more users with the plural pieces of the source information on which the predetermined data processing has been performed.

6. The system of claim 1, wherein
the second wireless access station is configured to recognize one or more wireless access stations that are located at the periphery of the second wireless station and capable of transferring information to and from the second wireless station via the memory of the at least one mobile terminal, based on information that is transferred from the one or more wireless access stations via the memory of the at least one mobile terminal.

7. The system of claim 1, wherein
the first wireless access station is configured to recognize one or more wireless access stations that are located at the periphery of the first wireless station and capable of transferring information to and from the first wireless station via the memory of the at least one mobile terminal, based on information that is transferred from the one or more wireless access stations via the memory of the at least one mobile terminal.

8. The system of claim 1, wherein
the source information includes information that is collected from at least one of a sensor provided for the first wireless access station, a wireless access station other than the first wireless access station, and the at least one mobile terminal.

9. The system of claim 1, wherein
the second wireless access station provides the one or more users with the source information on which the predetermined data processing has been performed, by outputting the source information to information equipment provided for the second wireless access station.

10. The system of claim 1, wherein
the predetermined data processing includes processing in which the source information is converted into a data format that is suited to be provided for the one or more users.

11. An apparatus for performing wireless communication between wireless access stations via a mobile terminal, the apparatus serving as one of a plurality of wireless access stations included in a wireless communication system, the apparatus comprising:
a memory to store source information to be provided for one or more users; and
a processor to:
perform wireless communication with one or more mobile terminals being located in a coverage area of the apparatus, perform packet transfer between the apparatus and a peer wireless access station via a memory unit provided for at least one mobile terminal in such a manner that
- a packet transmitted from one of the apparatus and the peer wireless access station is received by the at least one mobile terminal and stored in the memory unit thereof when the at least one mobile terminal is located in a coverage area of the one of the apparatus and the peer wireless access station, and
- the packet being stored in the memory unit of the at least one mobile terminal is transmitted from the at least one mobile terminal to the other one of the apparatus and the peer wireless access station when the at least one mobile terminal is located in a coverage area of the other one of the apparatus and the wireless access station, acquire the source information from the peer wireless access station by performing a predetermined procedure of packet transfer between the apparatus and the peer wireless access station via the memory unit of the at least one mobile terminal when the at least one mobile terminal moves between coverage areas of the apparatus and the peer wireless access station, to store the acquired source information in the memory, perform a predetermined data processing on the source information stored in the memory, and provide the one or more users with the source information on which the predetermined data processing has been performed, wherein the coverage area of the apparatus does not overlap with the coverage area of the peer wireless access station.

12. The apparatus of claim 11, wherein
the predetermined procedure of packet transfer includes:
- transferring an information-acquisition request packet for requesting the wireless access station to acquire the source information, to the peer wireless access station via the memory unit of the at least one mobile terminal when the at least one mobile terminal moves from a coverage area of the apparatus to a coverage area of the peer wireless access station; and
- transferring, in response to the information-acquisition request packet, an information notification packet including the source information to the apparatus via the memory unit of the at least one mobile terminal when the at least one mobile terminal moves from a coverage area of the peer wireless access station to a coverage area of the apparatus.

13. The apparatus of claim 11, wherein
the predetermined procedure of packet transfer includes:
- transferring an information-provision request packet for requesting the apparatus to provide the one or more users with the source information, from the peer wireless access station to the apparatus via the memory unit of the at least one mobile terminal when the at least one mobile terminal moves from a coverage area of the peer wireless access station to a coverage area of the apparatus; and
- transferring an information notification packet including the source information, from the peer wireless access station to the apparatus via the memory unit of the at least one mobile terminal when the at least one mobile terminal moves from a coverage area of the peer wireless access station to a coverage area of the apparatus.

14. A method for performing wireless communication between wireless access stations via a mobile terminal, the method comprising:
- providing a first wireless access station with source information to be provided for one or more users;
- transferring a packet between the first wireless access station and a second wireless access station via a memory provided for at least one mobile terminal in such a manner that
  - the packet transmitted from one of the first and second wireless access stations is received by the at least one mobile station and stored in the memory thereof when the at least one mobile terminal is located in a coverage area of the one of the first and second wireless access stations, and
  - the packet being stored in the memory of the at least one mobile station is transmitted from the at least one mobile station to the other one of the first and second wireless access stations when the at least one mobile station is located in a coverage area of the other one of the first and second wireless access stations;
- acquiring, by the second wireless access station, the source information from the first wireless access station by performing a predetermined procedure of packet transfer between the first and second wireless access stations via the memory of the at least one mobile terminal when the at least one mobile terminal moves between coverage areas of the first and second wireless access stations;
- performing, by the second wireless access station, a predetermined data processing on the acquired source information; and
- providing, by the second wireless access station, the one or more users with the source information on which the predetermined data processing has been performed,
wherein the coverage area of the first wireless access station does not overlap with the coverage area of the second wireless access station.

15. The method of claim 14, wherein
the predetermined procedure of packet transfer includes:
- transferring an information-acquisition request packet from the second wireless access station to the first wireless access station via a memory of a first mobile terminal included in the at least one mobile terminal when the first mobile terminal moves from a coverage area of the second wireless access station to a coverage area of the first wireless access station; and
- transferring, in response to the information-acquisition request packet, a information notification packet including the source information from the first wireless access station to the second wireless access station via a memory of a second mobile terminal included in the at least one mobile terminal when the second mobile terminal moves from a coverage area of the first wireless access station to a coverage area of the second wireless access station.

16. The method of claim 14, wherein
the predetermined procedure of packet transfer includes:
- transferring an information-provision request packet from the first wireless access station to the second wireless access station via a memory of a first mobile terminal included in the at least one mobile terminal when the first mobile terminal moves from a coverage area of the first wireless access station to a coverage area of the second wireless access station; and
- transferring an information notification packet including the source information from the first wireless access station to the second wireless access station via a memory of a second mobile terminal included in the at least one mobile terminal when the second mobile terminal moves from a coverage area of the first wireless access station to a coverage area of the second wireless access station.

17. A system for performing wireless communication between wireless access stations via a mobile terminal, comprising:

a first wireless access station to:
perform wireless communication with one or more mobile terminals being located in a coverage area of the first wireless access station, and
hold source information to be provided for one or more users;

a second wireless access station to:
perform wireless communication with one or more mobile terminals being located in a coverage area of the second wireless access station,
acquire the source information from the first wireless access station,
perform a predetermined data processing on the acquired source information, and
provide the one or more users with the source information on which the predetermined data processing has been performed; and at least one mobile terminal each having a memory, each of the at least one mobile terminal being configured to:
store, in the memory thereof, a packet received from one of the first and second wireless access stations when the each of the at least one mobile terminal is located in a coverage area of the one of the first and second wireless access stations, and
transmit the packet stored in the memory thereof to the other one of the first and second wireless access stations when the each of the at least one mobile terminal is located in a coverage area of the other one of the first and second wireless access stations, so that the packet is transferred between the first and second wireless access stations via the memory of the each of the at least one mobile terminal when the each of the at least one mobile terminal moves between coverage areas of the first and second wireless access stations, wherein the second wireless access station acquires the source information from the first wireless access station by performing a predetermined procedure of packet transfer between the first and second wireless access stations via the memory of the at least one mobile terminal when the at least one mobile terminal moves between coverage areas of the first and second wireless access stations, wherein the first wireless access station and the second wireless access station transmit the packet between one another via the at least one mobile terminal without direct communication between the first wireless access station and the second wireless access station.

* * * * *

UNITED STATES PATENT AND TRADEMARK OFFICE
CERTIFICATE OF CORRECTION

| | | |
|---|---|---|
| PATENT NO. | : 9,100,798 B2 | Page 1 of 1 |
| APPLICATION NO. | : 13/346121 | |
| DATED | : August 4, 2015 | |
| INVENTOR(S) | : Tomonori Sato | |

It is certified that error appears in the above-identified patent and that said Letters Patent is hereby corrected as shown below:

On the title page item (54) line 3,

Delete "COMMUNCIATION" and insert --COMMUNICATION BETWEEN WIRELESS--, therefor.

In the specification

Column 1, Line 3, in the title

Delete "COMMUNCIATION" and insert --COMMUNICATION BETWEEN WIRELESS--, therefor.

Signed and Sealed this
Twenty-fourth Day of November, 2015

Michelle K. Lee
*Director of the United States Patent and Trademark Office*